US00RE50003E

(19) United States
(12) Reissued Patent
Tippmann

(10) Patent Number: US RE50,003 E
(45) Date of Reissued Patent: Jun. 11, 2024

(54) HEAT TRANSFER SYSTEM FOR WAREHOUSED GOODS

(71) Applicant: Tippmann Engineering, LLC, Fort Wayne, IN (US)

(72) Inventor: Daniel J. Tippmann, Fort Wayne, IN (US)

(73) Assignee: Tippmann Engineering, LLC, Fort Wayne, IN (US)

(21) Appl. No.: 17/525,492

(22) Filed: Nov. 12, 2021

Related U.S. Patent Documents

Reissue of:
(64) Patent No.: 10,863,759
Issued: Dec. 15, 2020
Appl. No.: 16/228,978
Filed: Dec. 21, 2018

U.S. Applications:
(63) Continuation of application No. 15/282,496, filed on Sep. 30, 2016, now Pat. No. 10,194,682.
(Continued)

(51) Int. Cl.
*A23L 3/36* (2006.01)
*F25D 13/00* (2006.01)
(Continued)

(52) U.S. Cl.
CPC ..... *A23L 3/364* (2013.01); *F25D 13/00* (2013.01); *F25D 17/005* (2013.01);
(Continued)

(58) Field of Classification Search
CPC ..... F25D 17/06; F25D 25/02; F25D 13/00; F25D 17/005; F25D 17/045; A23L 3/364
See application file for complete search history.

(56) References Cited

U.S. PATENT DOCUMENTS 206,140 A 7/1878 Rumbaugh
239,345 A 3/1881 Sanford
(Continued)

FOREIGN PATENT DOCUMENTS

FR 2871222 12/2005
JP H1179330 A * 3/1999
(Continued)

OTHER PUBLICATIONS

"Go Tarpless", Thermal Technologies., 2004, 2 pages.
(Continued)

*Primary Examiner* — William C Doerrler
(74) *Attorney, Agent, or Firm* — Bailey Legal Services, PLLC

(57) ABSTRACT

A high efficiency airflow management system can be used to reliably and consistently draw air through palletized product stacks with a minimum of energy expenditure. A racking system is provided with a grid of pallet bays separated from an air plenum/chamber by a wall having an airflow opening for each pallet bays. An air seal is formed at the periphery of each opening by resiliently flexible side seals and a top seal to form a highly airtight interface between the pallet assembly and the adjacent airflow opening. When a pressure differential is developed between the chamber and the pallet bay, air is efficiently drawn substantially exclusively through the pallet assemblies with minimal leakage. The flexible sealing arrangement accommodates pallet assemblies with unevenly stacked rows of cases without significant loss of system efficiency.

26 Claims, 21 Drawing Sheets

NEW

Related U.S. Application Data

(60) Provisional application No. 62/235,030, filed on Sep. 30, 2015.

(51) Int. Cl.

| | |
|---|---|
| ***F25D 17/00*** | (2006.01) |
| ***F25D 17/04*** | (2006.01) |
| ***F25D 17/06*** | (2006.01) |
| ***F25D 25/02*** | (2006.01) |

(52) U.S. Cl.
CPC ..... *F25D 17/045* (2013.01); *F25D 17/06* (2013.01); *F25D 25/02* (2013.01)

(56) References Cited

U.S. PATENT DOCUMENTS

| | | | | |
|---|---|---|---|---|
| 677,536 | A | 7/1901 | Cooper | |
| 1,813,187 | A | 7/1931 | Moore | |
| 2,778,206 | A | 1/1957 | WIson et al. | |
| 3,479,947 | A | 11/1969 | Myers | |
| 3,545,223 | A | 12/1970 | Elland | |
| 3,621,672 | A * | 11/1971 | Meredith | F25D 17/00 62/266 |
| 3,638,450 | A | 1/1972 | Falk | |
| 4,063,432 | A | 12/1977 | Chaussy et al. | |
| 4,221,421 | A | 9/1980 | Bettker, Jr. et al. | |
| 4,425,768 | A | 1/1984 | Burns | |
| 4,474,020 | A | 10/1984 | Freeman | |
| 4,736,592 | A * | 4/1988 | Ohling | F25D 17/06 62/62 |
| 4,934,255 | A | 6/1990 | McDonnell et al. | |
| 5,353,564 | A | 10/1994 | Hansen | |
| 5,497,698 | A | 3/1996 | Bolkestein | |
| 5,575,714 | A | 11/1996 | Rijs | |
| 5,706,662 | A | 1/1998 | Van | |
| 5,778,557 | A | 7/1998 | Leavens | |
| 5,915,960 | A | 6/1999 | Check et al. | |
| 6,340,043 | B1 | 1/2002 | Paupardin | |
| 6,446,452 | B2 | 9/2002 | Durham | |
| 6,901,768 | B1 * | 6/2005 | Windecker | F25D 17/045 62/239 |
| 7,017,366 | B2 | 3/2006 | Bottom | |
| 7,178,356 | B1 | 2/2007 | Lingelbach et al. | |
| 7,832,218 | B2 | 11/2010 | Hawkins | |
| 7,913,513 | B1 * | 3/2011 | Bottom | A23B 7/148 62/426 |
| 8,459,180 | B2 | 6/2013 | Paupardin et al. | |
| 8,783,047 | B2 | 7/2014 | Tippmann | |
| 8,919,142 | B2 | 12/2014 | Tippmann | |
| 9,297,570 | B2 | 3/2016 | Tippmann | |
| 9,618,256 | B2 | 4/2017 | Tippmann | |
| 9,784,490 | B2 | 10/2017 | Tippmann | |
| 9,873,547 | B2 | 1/2018 | Tippmann | |
| 9,915,463 | B2 | 3/2018 | Tippmann | |
| 10,194,682 | B2 | 2/2019 | Tippmann | |
| 10,301,067 | B2 | 5/2019 | Tippmann | |
| 10,807,764 | B2 | 10/2020 | Tippmann | |
| 2003/0109963 | A1 * | 6/2003 | Oppedisano | G05B 9/02 454/187 |
| 2006/0185528 | A1 | 8/2006 | Tippmann et al. | |
| 2006/0272350 | A1 | 12/2006 | Weeth | |
| 2007/0159503 | A1 | 7/2007 | Kikuchi et al. | |
| 2010/0032105 | A1 | 2/2010 | Drifka | |
| 2011/0107784 | A1 | 5/2011 | Tippmann et al. | |
| 2013/0263614 | A1 * | 10/2013 | Tippmann | F25D 13/00 62/62 |

FOREIGN PATENT DOCUMENTS

| | | |
|---|---|---|
| WO | 2005106356 | 11/2005 |
| WO | 2007122334 | 11/2007 |

OTHER PUBLICATIONS

"Planning and engineering data . . . Fish freezing . . . Processing and equipment", Fisheries and Aquaculture Department, 1984, 15 pages.
"Thermal Tech Acquires Cool Care", Thermal Tech, vol. 5, No. 1, Spring 2002, 2 pages.

* cited by examiner

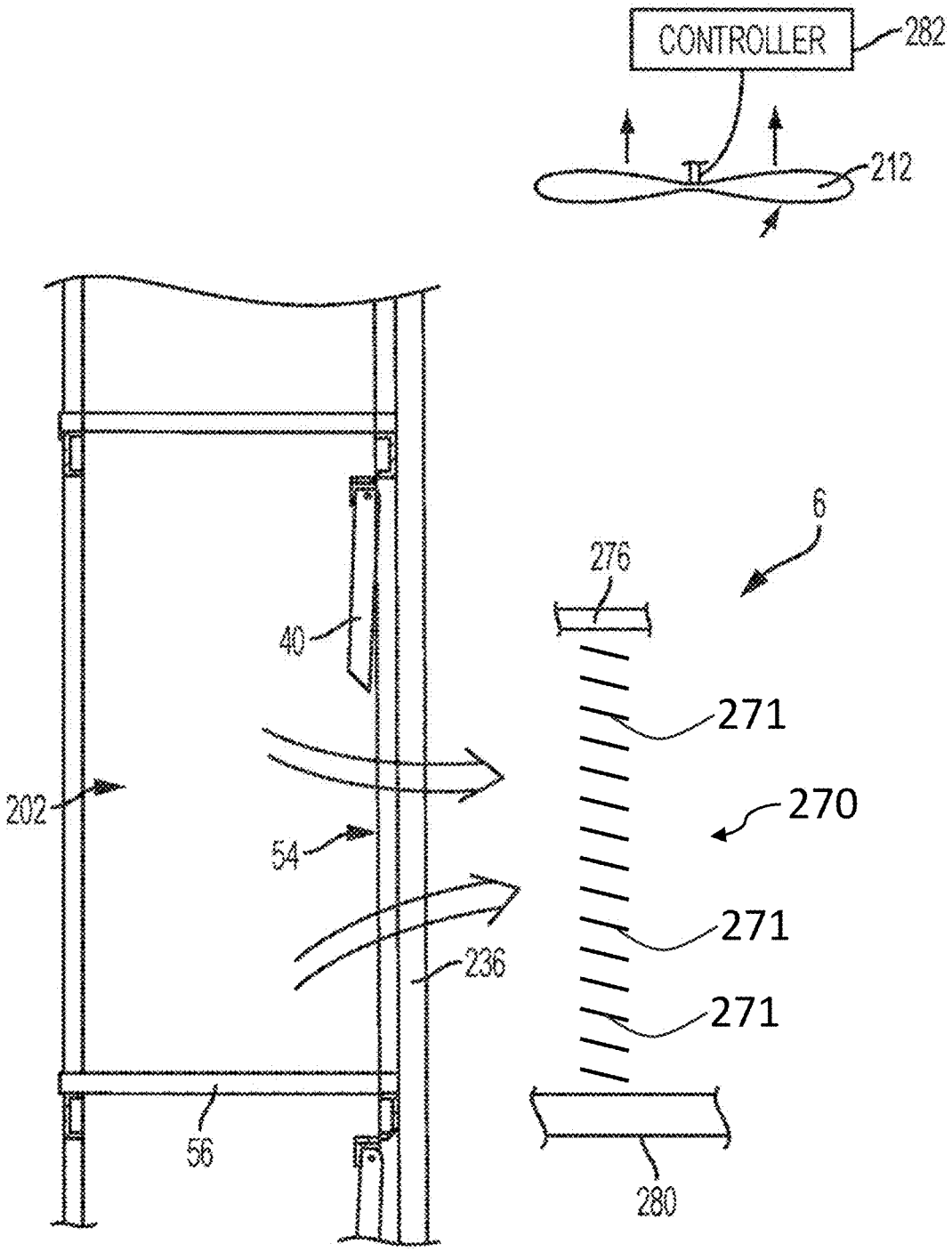
Fig. 20
NEW

HEAT TRANSFER SYSTEM FOR WAREHOUSED GOODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a broadening reissue application of and claiming priority to U.S. Pat. No. 10,863,759, entitled HEAT TRANSFER SYSTEM FOR WAREHOUSE GOODS, issued Dec. 15, 2020, which* is a continuation of application Ser. No. 15/282,496, filed Sep. 30, 2016, *now U.S. Pat. No. 10,194,682, issued Feb. 5, 2019,* which claims the benefit under Title 35, U.S.C. § 119(e) of U.S. Provisional Patent Application Ser. No. 62/235,030, entitled HEAT TRANSFER SYSTEM FOR WAREHOUSED GOODS and filed on Sep. 30, 2015, the entire disclosures of which [mare] *are* hereby expressly incorporated by reference herein.

BACKGROUND

1. Technical Field

The present disclosure relates to a warehouse that is capable of altering and/or holding steady the temperature of a quantity of product housed in cases forming pallet assemblies and storing such product, e.g., bulk foods. More particularly, the present disclosure relates to spacing, stacking and heat transfer structures used in such a warehouse.

2. Description of the Related Art

Freezer warehouses are known in which large pallets of items including meats, fruit, vegetables, prepared foods, and the like are frozen in blast rooms of a warehouse and then are moved to a storage part of the warehouse to be maintained at a frozen temperature until their removal.

U.S. Pat. No. 8,783,047 entitled "Rack-Aisle Freezing System for Palletized Product", filed on Sep. 8, 2010, the entire disclosure of which is hereby explicitly incorporated by reference herein, relates to an improved system for freezing food products. Shown in FIG. 1 is a large warehouse 2 that can be used to freeze and maintain perishable foods or like products. Large pallets of items, including meats, fruits, vegetables, prepared foods, and the like, are sent to warehouse 2 to be frozen employing a system whereby the palletized foods are frozen on storage racks.

FIG. 2 shows a top view of the interior of warehouse 2, in which rows of palletized product are shown such that pallet assemblies 52 abut chamber 6. As shown in FIG. 3, rows of racking 14 (see also FIG. 8) are positioned between aisles 10 and chambers 6. Each chamber 6 is enclosed by a pair of end walls 15 and top panel 17. Spacers 20 (FIGS. 5-7) separate respective rows of cases 22 to create a palletized product stack in the form of pallet assembly 52 which can be disposed and sealed against the exterior of racking 14 (FIG. 3) via forklifts 18 (see, e.g., FIGS. 3 and 4).

Air handlers 8, e.g., chillers or heaters (FIG. 2) provided in the interior of warehouse 2 produce conditioned, e.g., cold or warmed air and maintain the temperature of ambient air within the warehouse space at a desired temperature, e.g., +55° F. to −30° F. Thus, for purposes of the present disclosure, "air conditioner" refers to an air handler which can produce air conditioned to a desired state, e.g., heated or cooled. While warehouse 2 could be utilized to either freeze, cool or thaw a quantity of product housed in cases contained on pallet assemblies 52, the remaining description will use the example of a warehouse freezer, it being understood that similar arrangements and principles will be applied to a warehouse utilized to thaw product, with the air handler comprising a heater as opposed to a chiller.

Adjacent pairs of racking structures 14 (FIGS. 2-4) define a plurality of adjacent airflow chambers 6 (FIGS. 2 and 4) having air intake openings on opposite sides thereof and a plurality of air outlets having air moving devices, such as exhaust fans 12, on top panels 17, which cause conditioning air to be drawn into chambers 6 through the air intake openings in racking 14 and to then exhaust into the warehouse space. The plurality of airflow chambers 6 are each defined by a pair of end walls 15 and top wall 17 having one or more air outlets and exhaust fans 12 associated therewith (FIG. 3). Pallet assemblies 52 (FIG. 5) are pressed against the intake openings in racking 14 such that a seal is formed between the pallets and the intake openings via side periphery seals, a bottom periphery seal, and a top periphery seal. The seals together define each respective intake opening. Freezing air is drawn through air pathways 16 (FIGS. 2, 4, and 5) within the palletized product in a direction towards chamber 6 to thereby quickly freeze the product. As shown in FIG. 5, spacers 20 may be placed between rows of cases 22 of product in an attempt to provide air pathways 24 through which airflow can enter chamber 6.

U.S. Pat. No. 8,919,142 entitled "Swing Seal for a Rack-Aisle Freezing and Chilling System", filed on Mar. 29, 2011, the entire disclosure of which is hereby explicitly incorporated by reference herein, discloses a top periphery seal useable to seal an intake opening as described above and which automatically adjusts to the height of pallet assembly 52 as illustrated in FIG. 6. As illustrated in FIG. 6, pallet assembly 52 (comprised of a plurality of cases 22 stacked on spacers 20 and pallet 4) can be positioned along pallet guide 56 and pressed against airflow opening 54 such that a seal is formed between pallet assembly 52 and airflow opening 54 via side periphery seals, a bottom periphery seal and an automatically adjustable top periphery seal surrounding airflow opening 54. With such a construction, chilling or freezing air is drawn through air pathways 16 formed through pallet assembly 52, as illustrated in FIGS. 2, 4 and 5.

FIG. 5 illustrates predicate spacer 20 which is formed in an undulating "egg carton" configuration. As illustrated in FIG. 7, individual cases 22 can crush under the weight of the product contained therein and the product contained in cases stacked directly above to cause overlap of cases 22 with a spacer 20 and prohibit airflow between product cases 22 positioned on opposite sides of the obstructed spacer 20. Undulating spacers 20 are particularly susceptible to obstruction due to drooping or sagging cases 22 due to the inconsistent support structure caused by the "hill and valley" configuration of such spacers. FIG. 7 illustrates case crushing and drooping at various sides and levels of pallet assembly 52; however, this phenomenon is, in practice, more prevalently seen with respect to the spacers 20 separating lower rows of cases 22, as the bottom of pallet assembly 52 contains the heaviest cumulative load of cases 22 stacked thereon.

In the above described installation, utilizing "egg carton" spacers 20, heat transfer from chilled ambient air in warehouse 2 to the products contained in cases 22 is effected through forced convection which is facilitated by the irregular shape of egg carton spacers 20 to allow airflow in all directions through pallet assembly 52. Alternative spacers such as wood slat spacers may also be utilized to separate cases 22 on pallet 4.

For maximum effectiveness of thermal transfer between the conditioned air in warehouse 2 and the product contained in product cases 22, it is desirable to have air within the spacers continuously refreshed and replaced with conditioned air from warehouse 2. One may to achieve this air movement is to use fans 12 (FIGS. 3 and 4) to drive airflow through and around pallet assemblies 52.

SUMMARY

The present disclosure provides a high efficiency airflow management system which can be used to reliably and consistently draw air through palletized product stacks with a minimum of energy expenditure. A racking system is provided with a grid of pallet bays separated from an air plenum/chamber by a wall having an airflow opening for each pallet bays. An air seal is formed at the periphery of each opening by resiliently flexible side seals and a top seal to form a highly airtight interface between the pallet assembly and the adjacent airflow opening. When a pressure differential is developed between the chamber and the pallet bay, air is efficiently drawn substantially exclusively through the pallet assemblies with minimal leakage. The flexible sealing arrangement accommodates pallet assemblies with unevenly stacked rows of cases without significant loss of system efficiency.

In certain exemplary embodiments, the racking system may further include an air dam within the plenum which operates to compensate for a vacant bay by automatically closing some or the entire air flow opening upon removal of the pallet assembly from the bay. For example, the air dam may take advantage of the increased air flow which results from removing the pallet assembly from its seal configuration against the air flow opening to pivot or swivel an air dam to a shut position to prevent significant draws of air through the vacant bay and into the plenum. This vacant bay compensation system cooperates with the tight air seal in occupied pallet bays to minimize the power required of the fans serving the plenum.

The disclosure, in one form thereof, provides an installation for warehousing palletized product, comprising: a pallet racking assembly comprising: a pallet receiving space sized and configured to receive a pallet assembly including a pallet and a plurality of vertically stacked rows of cases disposed on the pallet and providing an airflow pathway through the vertically stacked rows of cases; an airflow chamber including an air inlet and an air outlet; an air handler positioned to direct air into the airflow chamber from the air inlet and exhaust air from the airflow chamber through the air outlet; a wall disposed between the pallet receiving space and the airflow chamber, the wall having at least one airflow opening having a substantially planar opening periphery defining an opening plane, the airflow opening sized and positioned to be engaged by the pallet assembly when the pallet assembly is pressed against the opening periphery; a first side seal and disposed along a first side edge of the opening periphery, the first side seal defining a resiliently deformable first seal surface extending from the first side edge into the pallet receiving space, such that the first seal surface faces the pallet receiving space and defines a first obtuse angle with the opening plane; a second side seal and disposed along a second side edge of the opening periphery, the second side seal defining a resiliently deformable second seal surface extending from the second side edge into the pallet receiving space, such that the second seal surface faces the pallet receiving space and defines a second obtuse angle with the opening plane.

The disclosure, in another form thereof, provides an installation for warehousing pallets of product, comprising: a plurality of pallet assemblies, each pallet assembly comprising: a pallet; a plurality of vertically stacked rows of cases disposed on the pallet and providing an airflow pathway through the vertically stacked rows of cases containing the product; and at least one spacer disposed between the plurality of vertically stacked rows of cases, the spacer having a longitudinal airflow channel formed therethrough; and a pallet racking assembly comprising: a plurality of pallet bays having the plurality of pallet assemblies removably received therein; an airflow chamber including an air inlet and an air outlet; an air handler positioned to direct air into the airflow chamber from the air inlet and exhaust air from the airflow chamber through the air outlet; a wall disposed between the plurality of pallet bays and the airflow chamber, the wall having an airflow opening in each of the plurality of pallet bays, each airflow opening having a substantially planar opening periphery defining an opening plane, the airflow opening sized and positioned to be engaged by the pallet assembly when the pallet assembly is pressed against the opening periphery;

The disclosure, in a further form thereof, provides a method of sealing an airflow opening with a pallet assembly, the method comprising: advancing the pallet assembly into a pallet bay along a depth direction until the pallet assembly reaches a seat position adjacent the airflow opening; during the step of advancing the pallet assembly, engaging the pallet assembly with a resiliently flexible left side seal and a resiliently flexible right side seal disposed at the left and right edges of the airflow opening respectively; during the step of engaging, deflecting the left side seal and the right side seal toward the airflow opening along the depth direction and away from the airflow opening along a lateral direction, such that the left side seal and right side seal conform to left and right vertical edges of the pallet assembly respectively; and during the step of advancing the pallet assembly, engaging the pallet assembly with a top seal.

BRIEF DESCRIPTION OF THE DRAWINGS

The above mentioned and other features and objects of this disclosure, and the manner of attaining them, will become more apparent and the disclosure itself will be better understood by reference to the following description of embodiments of the disclosure taken in conjunction with the accompanying drawings, wherein:

*FIG. 20 is another schematic, elevation view of the portion of the racking assembly shown in FIG. 18 with an alternative air dam.*

Figure 1:
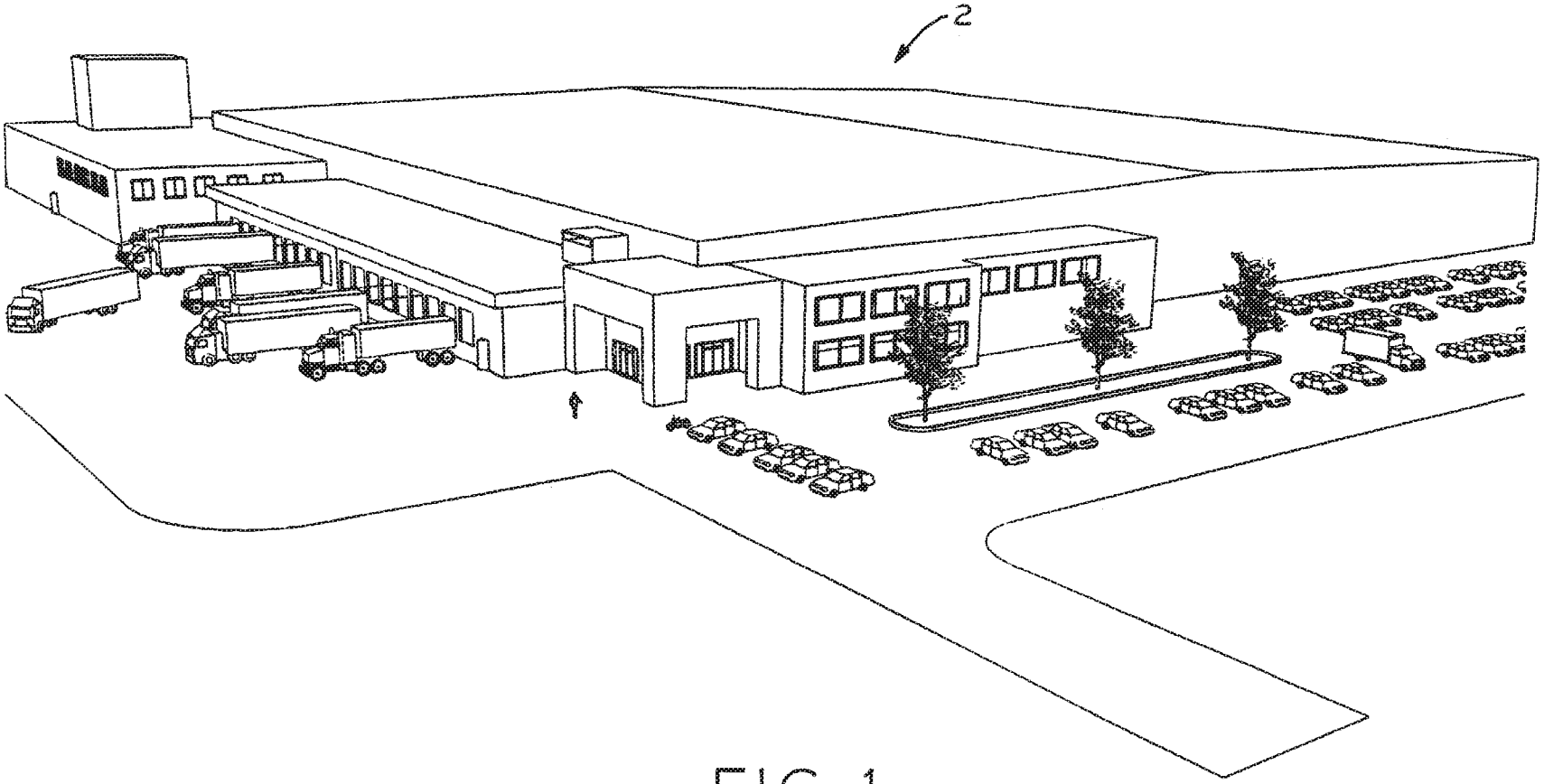
FIG. 1 is a perspective view of a warehouse incorporating a heat transfer system in accordance with the present disclosure.

Corresponding reference characters indicate corresponding parts throughout the several views. Although the exemplifications set out herein illustrate embodiments of the disclosure, in several forms, the embodiments disclosed below are not intended to be exhaustive or to be construed as limiting the scope of the disclosure to the precise forms disclosed.

DETAILED DESCRIPTION

Figure 15:
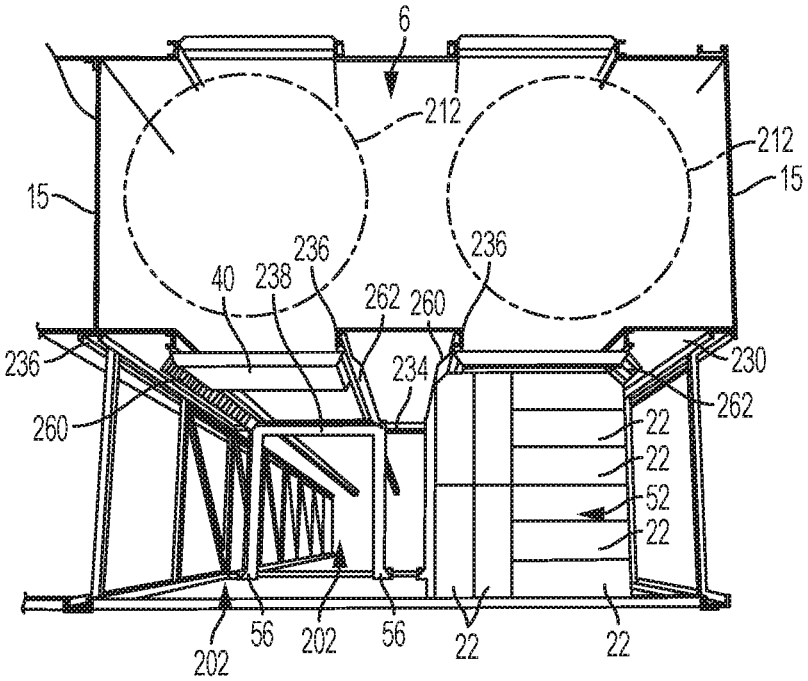
FIG. 15 is a top perspective view of a portion of the racking assembly shown in FIG. 10, illustrating occupied and vacant bays.

The present disclosure provides a system and method for efficiently directing air flow through pallet assemblies 52 with a minimum of energy expenditure by the fans which drive such air flow. In particular, and as described in further detail below, the present disclosure provides racking assembly 214 (FIG. 10) including an arrangement of resiliently flexible side seals 260, 262 disposed along the side edges of an airflow opening 54. The side seals 260, 262 cooperate with either a swing seal 40 or a top seal (not shown) to provide a substantially air tight seal between pallet assemblies 52 and the periphery of respective air flow openings 54 (FIG. 15). This illustrated arrangement of seals, together with the overall air tight structure of racking assembly 214, ensures that pressure differentials induced by fans 212 between chamber 6 and the ambient warehouse environment will cause airflow exclusively through the intended pathways through and between cases 22 of pallet assemblies 52 via airflow openings 54, without any significant "leakage" or "spillage" of air around pallet assemblies 52.

In addition, an arrangement of air dams 270 (FIGS. 18 and 19) may be provided within or external to air chamber 6 and configured to substantially reduce or eliminate air flow through vacant bays 202 of racking 214 when pallet assemblies are removed therefrom. By restricting such vacant-bay air flow, the desired pressure differential between chamber 6 and the ambient air of warehouse 2 may be reliably maintained without increasing the power requirements of fans 212.

1. Palletized Product Environment, Assembly and Arrangement.

Figure 2:
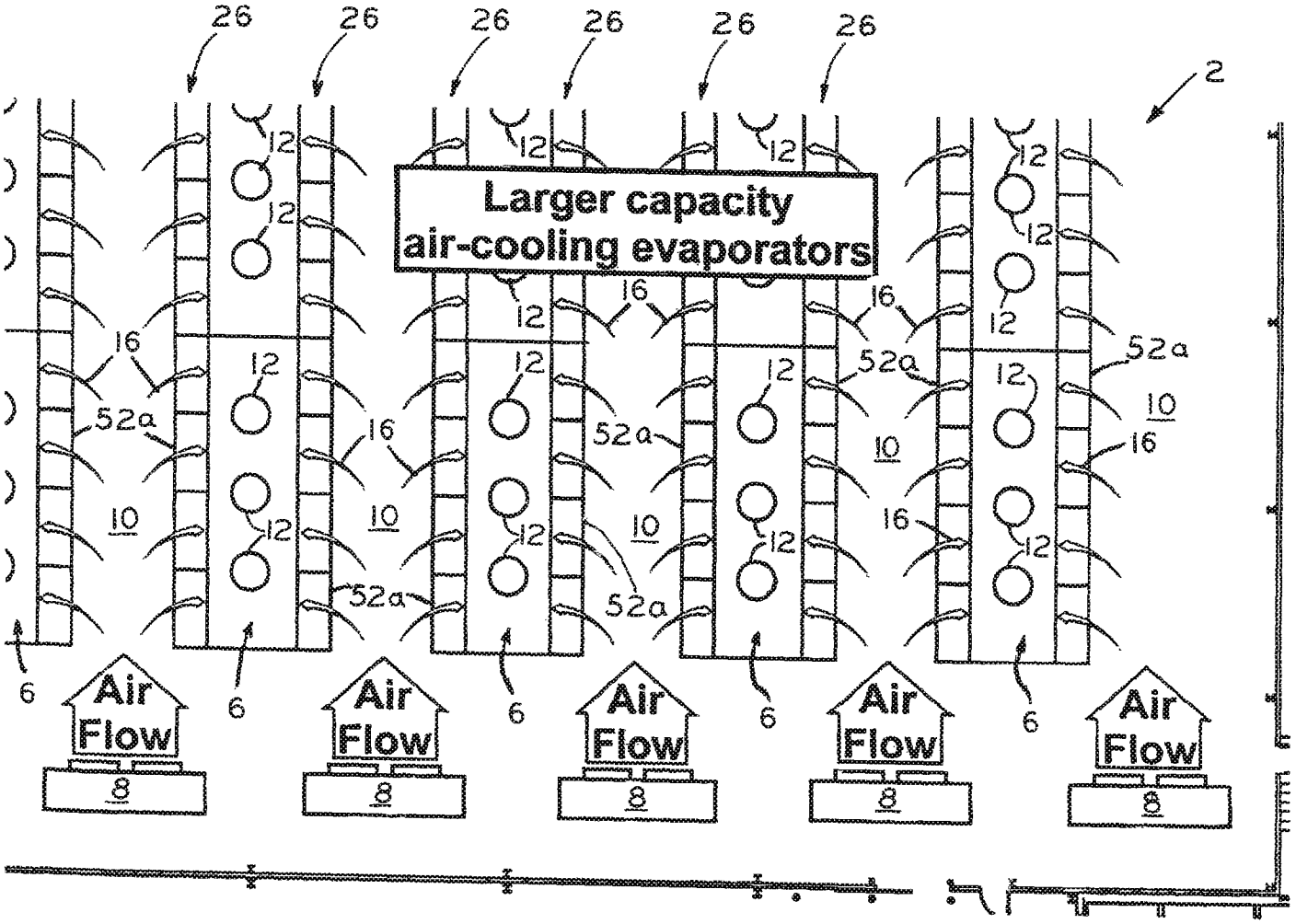
FIG. 2 is a diagrammatic top view of a heat transfer warehouse incorporating the system of the present disclosure.
Figure 3:
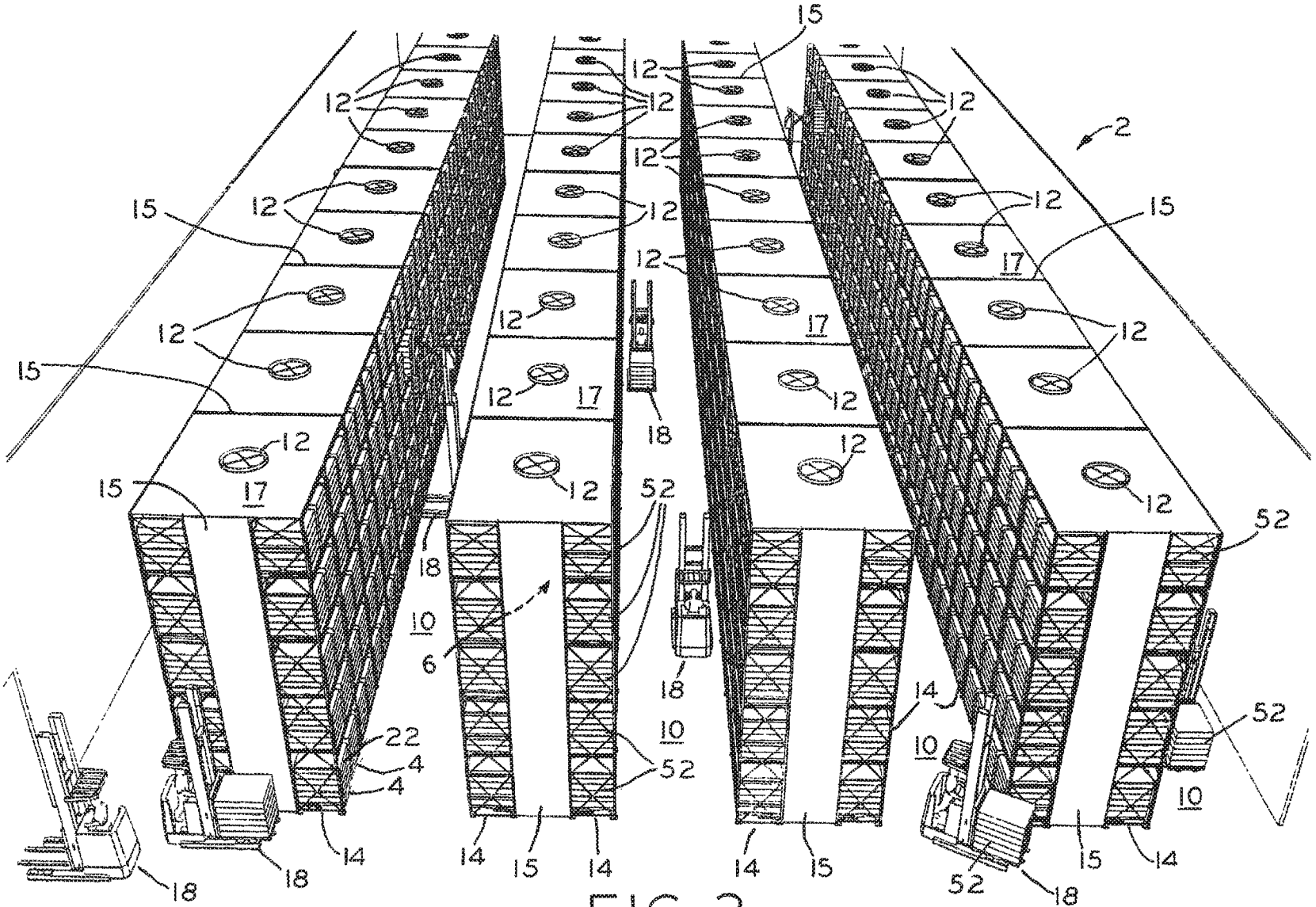
FIG. 3 is a perspective view of the interior of the warehouse illustrated in FIG. 1.
Figure 4:
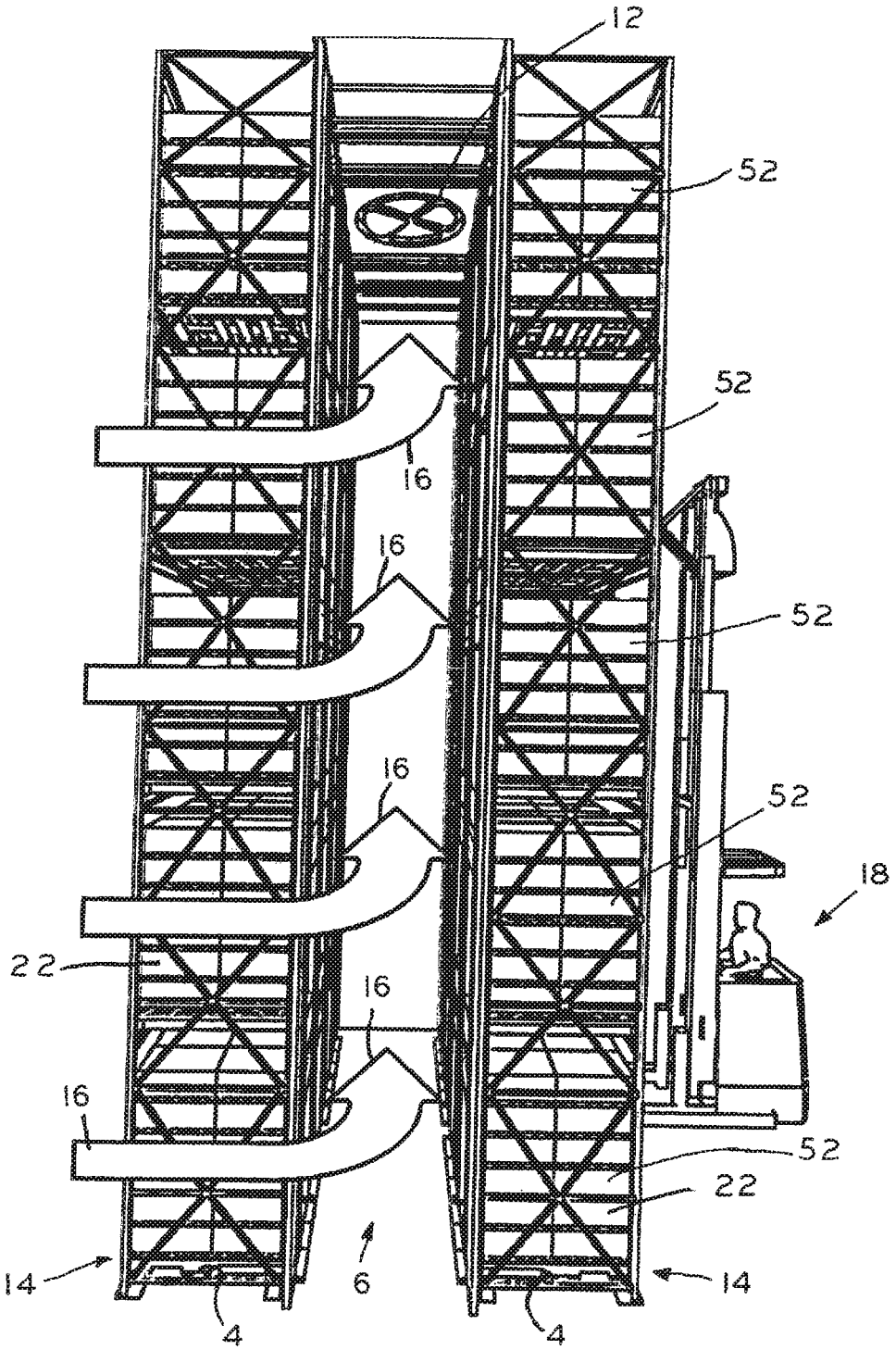
FIG. 4 is a perspective, end view of two rows of racking separated by an airflow chamber.

Pallet assemblies 52 form a part of warehouse installation 2 depicted, e.g., in FIG. 2. The general structure and components of warehouse 2 are described above in the background section of this document. A portion of this description will be repeated here to facilitate an understanding of the present invention. As illustrated in FIG. 2, warehouse 2 includes rack rows 26 separated by chambers 6 and aisles 10. As illustrated in FIGS. 3 and 4, racks 14 are sized for receiving a plurality of pallet assemblies 52. Racking 14 can be sized to receive a different number of pallet assemblies, as necessary. Different assemblies of racking 14 are illustrated, e.g., in FIGS. 3, 4, 8 and 10.

Figure 9:
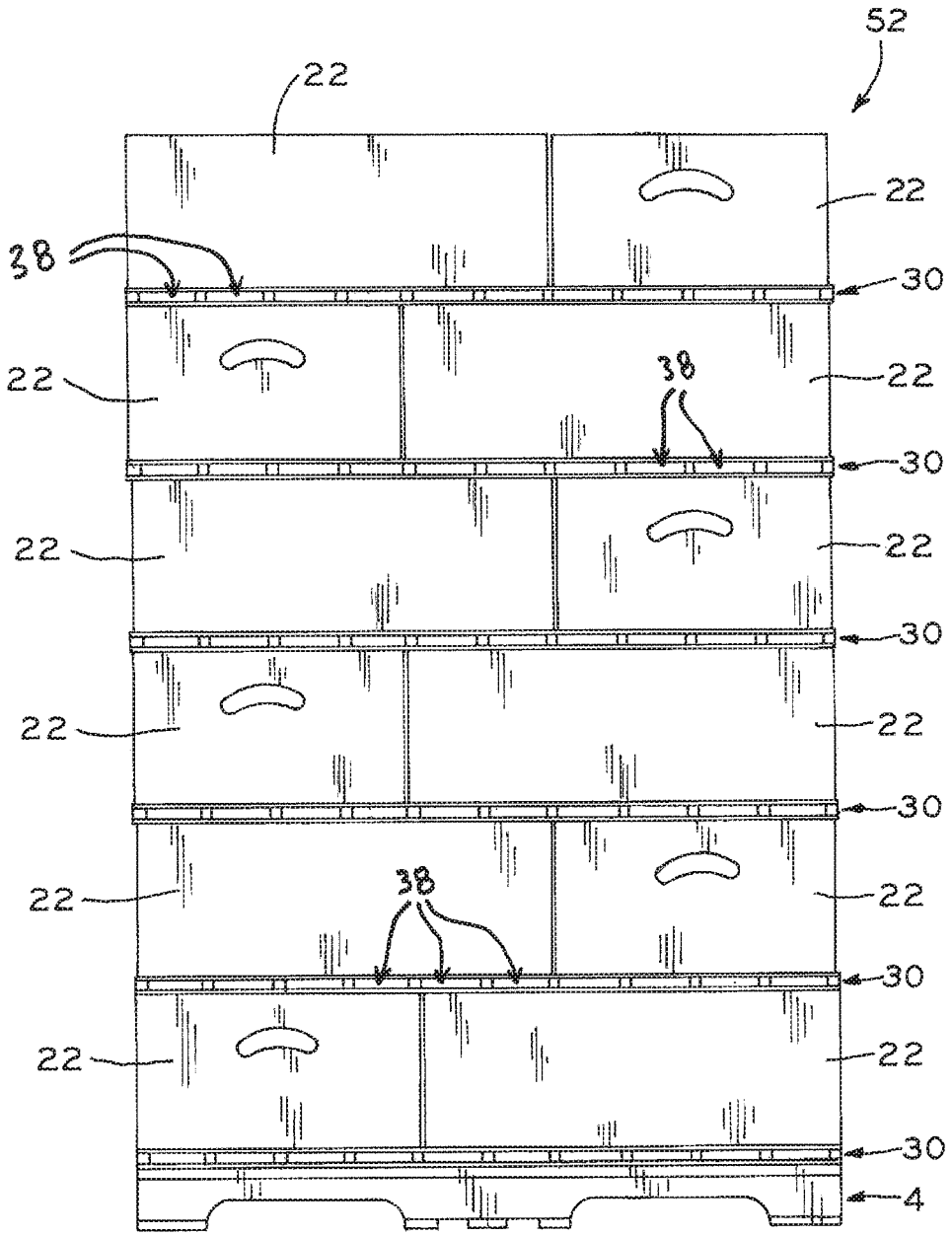
FIG. 9 is an end view of a pallet assembly in accordance with the present disclosure.

As depicted, e.g., in FIG. 9, pallet assemblies 52 include pallet 4, on which a plurality of cases 22 are stacked, with spacers 30 interposed between layers of cases 22. Spacers 30 are provided to facilitate airflow across the entire downstream extent of pallet assemblies 52, thereby ensuring heat transferring airflows to all of cases 22 among the various layers stacked upon pallets 4. Exemplary spacers and other racking systems and structures which may be used in conjunction with the present disclosure are described in U.S. Patent Application Publication No. 2014/0273793, filed Jan. 28, 2014 and entitled HEAT TRANSFER SYSTEM FOR WAREHOUSED GOODS, and in U.S. Patent Application Publication No. 2014/0273801, filed Mar. 15, 2013 and entitled SPACER FOR A WAREHOUSE RACK-AISLE HEAT TRANSFER SYSTEM, the entire disclosures of which are hereby explicitly incorporated herein by reference.

With pallet assemblies 52 arranged in rows and columns on racks 14, warehouse installation 2 can be utilized to raise, lower and/or maintain the temperature of a quantity of product contained in cases 22 to a desired set point. As illustrated in FIGS. 3 and 4, aisles 10 are sufficiently wide to allow forklifts 18 to access pallet assemblies 52. Typical aisle width is between 5 feet to 14 feet depending on the type of lift equipment. Pallet assemblies 52 each include a pallet 4 at the bottom thereof. As used in this document, "pallet" is used to denote a standard warehouse pallet of box section open at least two ends (some pallets are called 4-way pallets due to fork openings on all 4-sides) to allow the entry of the forks of a forklift so that a palletized load, i.e., pallet assembly 52, can be raised, moved about and set down easily.

Racks 14 define airflow openings 54 fluidly connected to a chamber 6, which, in the exemplary embodiment illustrated, is enclosed by a pair of end walls 15 and top panel 17. Pallet assemblies 52 are disposed and sealed against the air intake openings formed in racks 14, as described in detail below. Referring to FIG. 2, air handlers 8 are operably connected to (e.g., disposed within) warehouse space 2 so that air handlers 8 can condition (e.g., heat or cool) the ambient air in warehouse space to a desired temperature. In the event that warehouse space 2 is utilized to freeze product contained in cases 22, air handlers 8 may be chillers which produce air on the order of −5° F. to −30° F. In the event that warehouse space 2 is utilized to thaw product contained in cases 22, air handlers 8 may be heaters which produce air on the order of 30° F. to 60° F. Additional air handlers, illustratively fans 12, circulate ambient air conditioned by air handlers 8 such that air conditioned by air handlers 8 flows through pallet assemblies 52 and through airflow openings 54 formed in racks 14.

In one exemplary embodiment, pallet 4 defines a standard 40 inch by 48 inch rectangular outer perimeter. With such a pallet, first surface 32 and second surface 34 of spacer 30 illustrated in FIG. 9 will both be substantially rectangular in shape and about 40 inches by about 48 inches. Stated another way, first surface 32 and second surface 34 are both nominally rectangular and nominally measure about 40 inches by 48 inches. In certain alternative embodiments, spacers 30 will be slightly oversized with respect to pallet 4, e.g., by having an overhang of up to an inch relative to the perimeter of pallet 4. These embodiments are also considered to be sized and shaped "about congruent" to the outer perimeter of pallet 4. Alternative pallet sizes, such as a standard European pallet may be utilized. Spacers 30 may be about congruent with the pallet and cases with which the spacers 30 are paired.

As illustrated in, e.g., FIG. 9, spacers 30 may have longitudinal airflow channels 38 formed therethrough. Airflow channels 38 facilitate a generally longitudinal, directional flow of air through the spacer from an input at one side of the palletized product assembly 52 to an output at an opposite side. Further discussion of exemplary longitudinal channels and spacer arrangements can be found in U.S. Patent Application Publication No. 2014/0273793, filed Jan. 28, 2014 and entitled HEAT TRANSFER SYSTEM FOR WAREHOUSED GOODS, and in U.S. Patent Application Publication No. 2014/0273801, filed Mar. 15, 2013 and entitled SPACER FOR A WAREHOUSE RACK-AISLE HEAT TRANSFER SYSTEM, the entire disclosures of which are hereby explicitly incorporated herein by reference. Although spacers 30 provide enhanced airflow and heat transfer performance characteristics as compared to predicate spacers 20 and are used in an exemplary embodiment of pallet assembly 52, it is contemplated that spacers 20 may also be used in pallet assembly 52 together with racking 214 (described further below), as required or desired for a particular application.

2. Racking Assembly and Pallet/Rack Interface.

Figure 10:
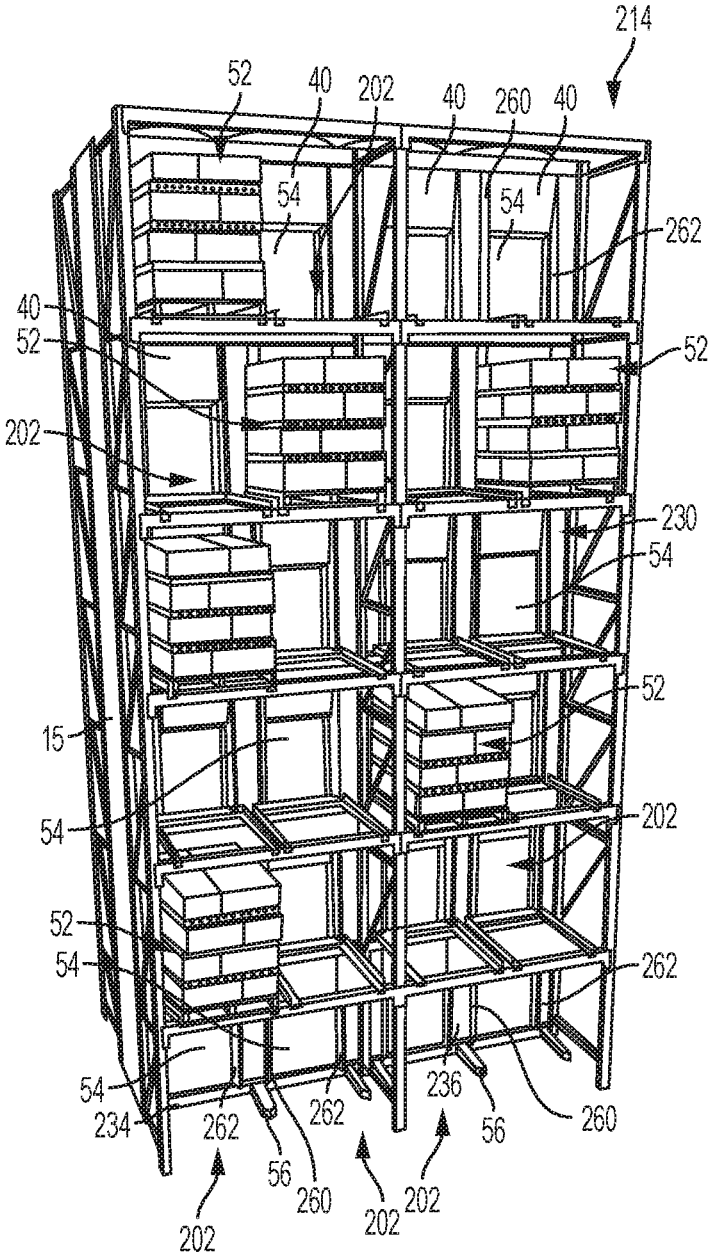
FIG. 10 is a perspective view of a multi-bay racking system including resiliently flexible side seals in accordance with the present disclosure.

Turning now to FIG. 10, racking assembly 214 is shown with pallet receiving spaces, hereinafter referred to as bays 202 arranged in six rows of four bays. As described above, bays 202 of racking 214 may be provided in any configuration of columns and rows, as may be required or desired for a particular application, or may be provided with a single bay 202 in some applications. In the illustrated embodiment of FIG. 10, various bays 202 are shown vacant, while other bays 202 include a pallet assembly 52 received therein and sealingly engaged over airflow openings 54.

Figure 5:
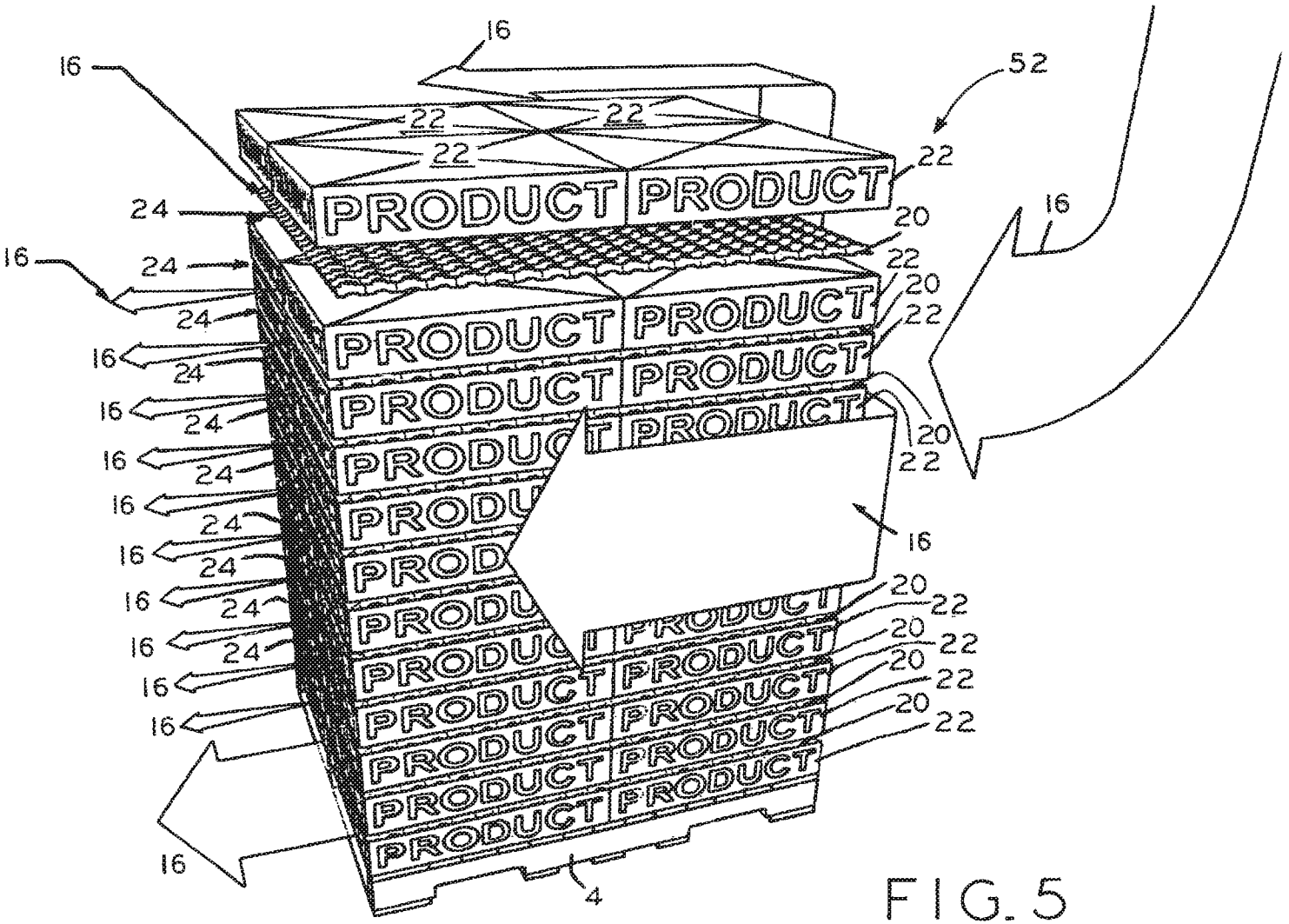
FIG. 5 is a perspective view showing a desired airflow through a pallet assembly.

As further described below, each bay 202 includes left side seal 260 and right side seal 262 which cooperate to prevent airflow around the sides of pallet assemblies 52 during operation of the installation, e.g., via air pathways 16 as shown in FIG. 5. Each bay 202 may also include a top seal, such as swing seal 40 disposed in the upper portion of each airflow opening 54, which prevents airflow over the top of pallet assembly 52.

As also described further below, each airflow opening 54 may have air dam 270 positioned behind opening 54 (FIGS. 18 and 19) and within air plenum or chamber 6 in order prevent large-volume flows of air through airflow openings 54 when bays 202 are vacant. In an exemplary embodiment, the illustrated arrangement of seals and air dams cooperate to provide a highly airtight interface between chamber 6 and bays 202, such that substantial air flows may be achieved substantially exclusively through pallet assemblies 52. This ensures that the electrical power provided to fans 212 is used solely for its intended purpose of transferring heat to or away from the product in cases 22, and therefore enables the use of smaller and/or reduced-power fans as compared to what would be required for a more "leaky" system. Such reduced-power fans may be less expensive to purchase and maintain, and require minimal expenditure on electrical power for operation.

For purposes of the present disclosure, reference directions relative to racking assembly 214 are taken from the perspective of an operator of racking assembly 214 facing bays 202 from within aisle 10 (FIG. 2). Thus, a "depth direction" is the direction of insertion or removal of pallet assembly 52 into or out of a respective bay 202. The depth direction is therefore the direction along which the depth dimension of bays 202 is measured. Similarly, a "width direction" refers to a transverse direction perpendicular to the depth direction. The width direction is therefore the direction along which the width of bays 202 is measured, with the width of an illustrated bay 202 being the shortest distance between a pair of pallet guides 56. Finally, a "height direction" refers to a vertical direction perpendicular to both the depth and width directions. The width direction is therefore the direction along which the overall height of bays 202 is measured. In the illustrative embodiment of FIG. 13, opening plane P is defined by airflow openings 54 and extends along the width and height directions and is perpendicular to the depth direction.

Figure 11:
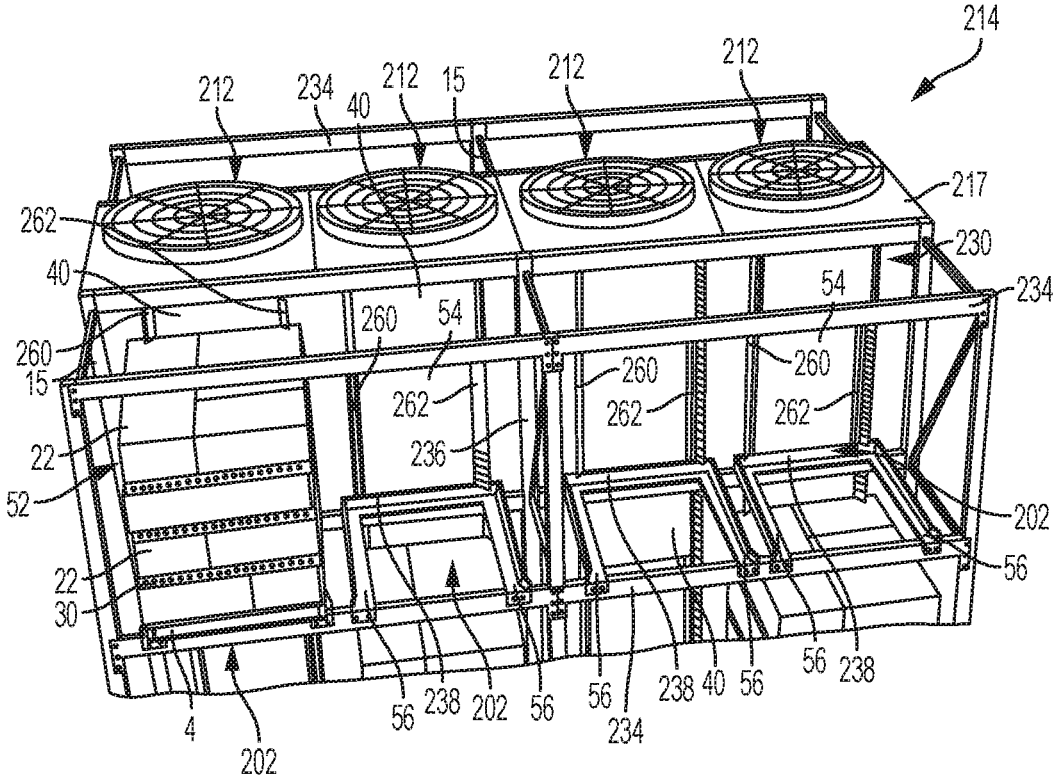
FIG. 11 is a perspective view of a portion of the racking system shown in FIG. 10, illustrating the placement of fans atop a plenum.
Figure 13:
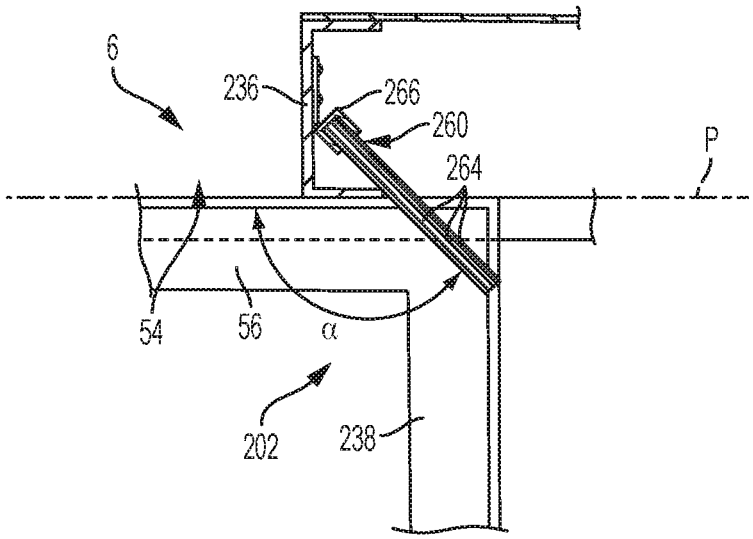
FIG. 13 is a top plan view of a portion of the vacant bay shown in FIG. 12, taken along the line XIII-XIII of FIG. 12, illustrating an undeflected side seal.

As best seen in FIGS. 11 and 15, pallet assembly 52 interacts with side seals 260, 262 and swing seal 40 when received and seated within a vacant bay 202. As noted above, pallet assembly 52 may include several layers of stacked cases 22 on top of pallet 4, with airflow spacers 30 disposed between respective layers. Assembly 52 is deposited into a vacant bay 202 by passing pallet 4 into pallet guides 56 and advancing pallet assembly 52 along the depth direction into the bay 202 until pallet 4 abuts pallet stop frame member 238. Pallet stop frame member 238 is substantially flush with airflow opening 54, which in turn defines a substantially planar opening periphery defining opening plane P as shown in FIG. 13.

If the various cases 22 and spacers 30 of pallet assembly 52 are evenly stacked upon one another, cases 22 and spacers 30 may cooperate with the adjacent portions of wall 230 to form a marginal air seal in this "fully seated" position of pallet assembly 52. This marginal seal may allow an acceptably low amount of air to flow around pallet assembly 52 and into airflow opening 54, i.e., air pathways 16 (FIG. 5) may be acceptably low.

Figure 16:
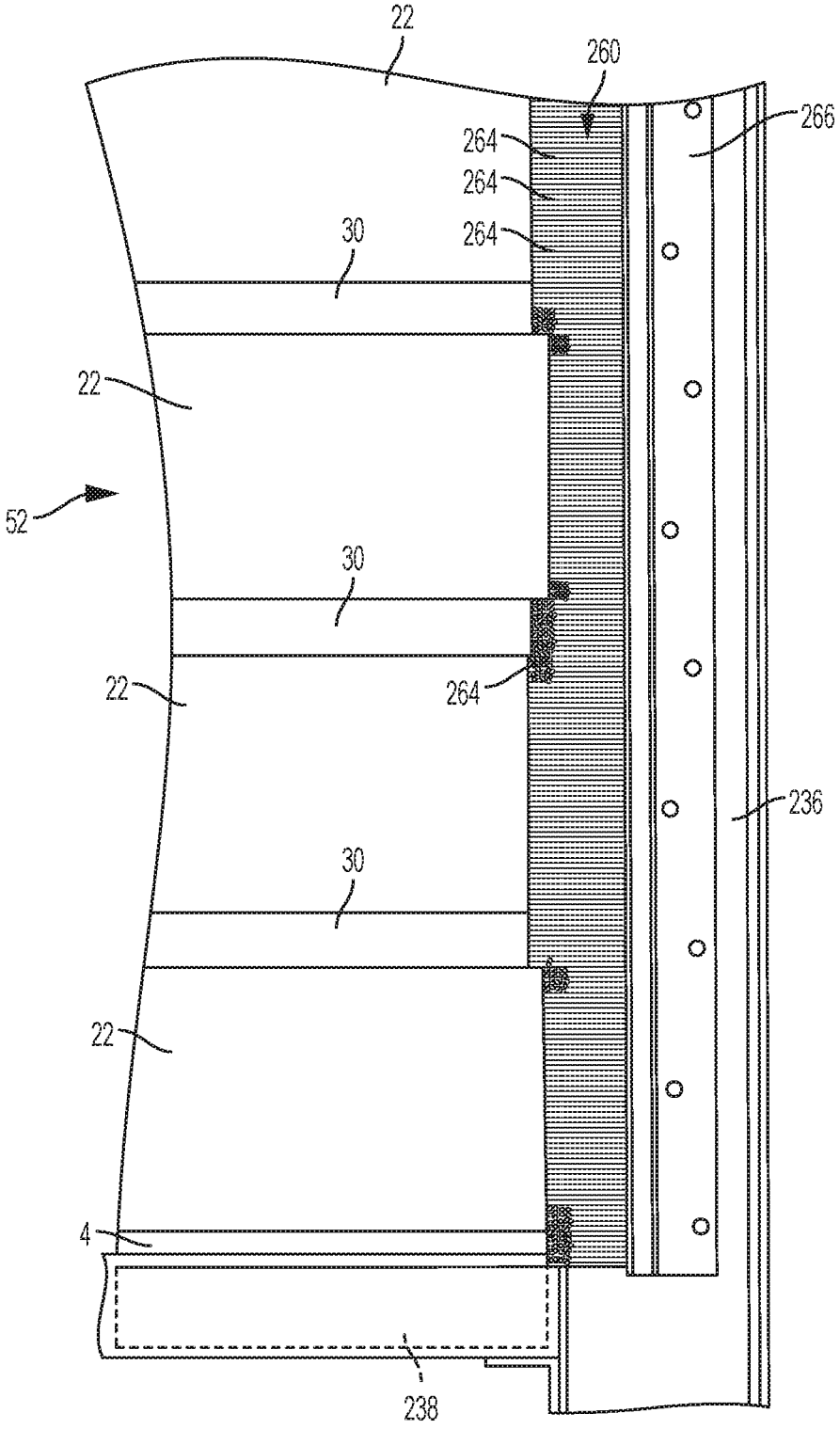
FIG. 16 is an elevation view of a portion of the racking assembly shown in FIG. 10, taken from within the air plenum of the assembly, and illustrating engagement of unevenly stacked pallet cases with the resiliently flexible side seal.

However, as best seen in FIG. 16, some pallet assemblies may have unevenly stacked cases 22 and/or spacers 30. Such uneven stacking may result from, e.g., shifting during transport, variable sizes among cases 22, or imprecise stacking of cases 22 and/or spacers 30 during preparation of pallet assembly 52. When unevenly stacked in this way, substantial gaps may exist between respective cases 22 and/or spacers and the adjacent periphery of airflow opening 54 even when pallet 4 is fully seated against pallet stop frame member 238. Left side seal 260 and right side seal 262 are disposed along respective side edges of the periphery of airflow opening 54, as best seen in FIG. 12, minimize or eliminate airflow via pathways 16 (FIG. 5) arising from such uneven stacking arrangements, as further described below.

Figure 12:
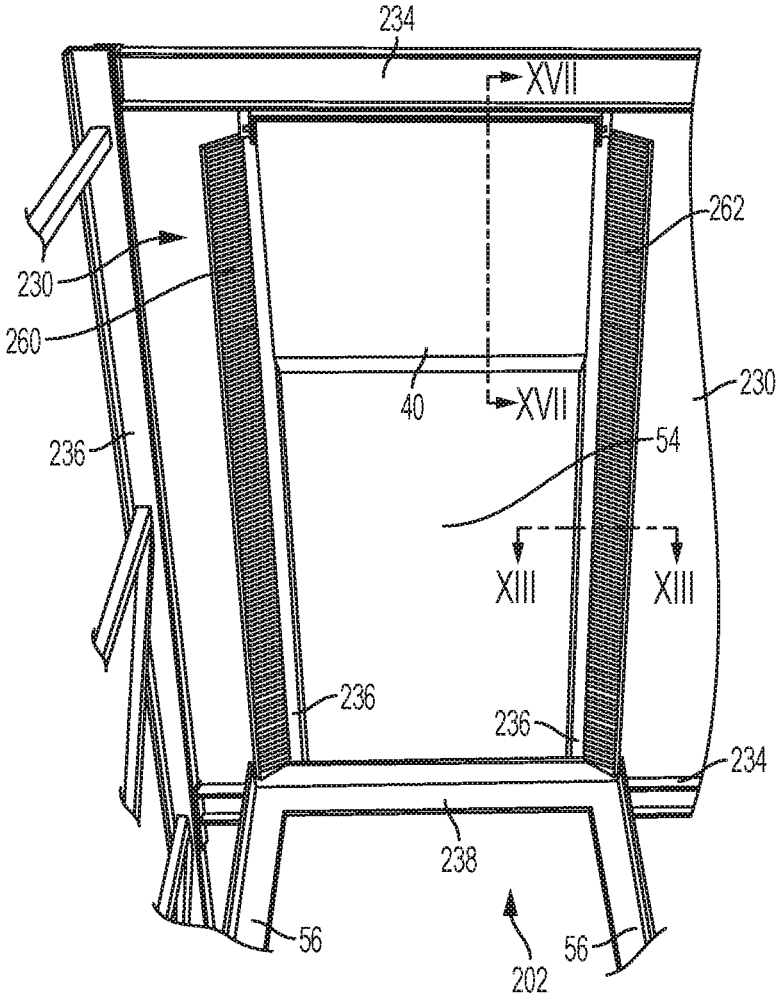
FIG. 12 is a perspective view of vacant bay in the racking system of FIG. 10, showing two flexible side seals and a top swing seal.

In an exemplary embodiment, side seals 260, 262 extend vertically from the base of airflow opening 54, illustrated as the top of pallet stop frame member 238 in FIG. 12, to the upper edge of the periphery of opening 54. This full-height configuration ensures that the side seals will be maintained regardless of the amount of rotation experienced by swing seal 40, which is dependent on the height of pallet assembly 52. A lower height of pallet assembly 52 results in relatively less rotation when assembly 52 is fully seated in bay 202 (see, e.g., FIG. 18), but for a taller pallet assembly 52 (such as a pallet assembly 52 which occupies nearly the entire vertical height of pallet bay 202), swing seal 40 may rotate into chamber 6 by a substantial amount. In this tall-pallet configuration, the illustrated full-height side seals 260, 262 can maintain an airtight side seal even if portions of swing seal 40 rotate away from the periphery of opening 54. However, in some embodiments, it may be suitable to terminate side seals 260, 262 at a lower height, including as low as the lower edge of swing seal 40.

In the illustrated embodiment, left side seal 260 and right side seal 262 are mirror images of one another about a vertical plane bisecting bay 202 (i.e., a vertical plane extending in the depth direction). Accordingly, both side seals 260, 262 have the same structure and spatial arrangement with respect to the surrounding structures of racking assembly 214, and a reference to left side seal 260 can be taken as a corresponding reference to right side seal 262.

Side seal 260 is made from a resiliently deformable material, illustratively from a series of substantially parallel resiliently deformable fibers 264, as shown in FIG. 13. This type of seal is commonly referred to a "brush seal" because the fibers 264 combine to form a brush-like appearance. Through the individual deformation of fibers 264, side seal 260 can selectively resiliently deform along its entire vertical extent to closely conform to each individual case 22 and/or spacer 30 of pallet assembly 52, regardless of the non-uniform corner surfaces which may be presented by these structures as shown in FIG. 16. In the illustrated embodiment, fibers 264 of seal 260 extend outwardly away from plane P of airflow opening 54 (FIG. 13) in both the depth direction (i.e., fibers 264 protrude inwardly into pallet bay 202) and in the width direction (i.e., fibers 264 protrude laterally away from airflow opening 54). However, fibers 264 are each substantially parallel with the ground, and therefore do not extend vertically along the height direction by a substantial amount (e.g., each fiber 264 protrudes vertically by less than 5% of its axial length). As best seen in FIG. 16, this configuration of fibers 264 takes advantage of the generally rectangular cuboid shape of cases 22 and spacers 30 such that fibers 264 follow the right-angle contour of pallet assembly 52, to minimize air gaps between side seal 260 and unevenly stacked pallet assembly 52.

Figure 14:
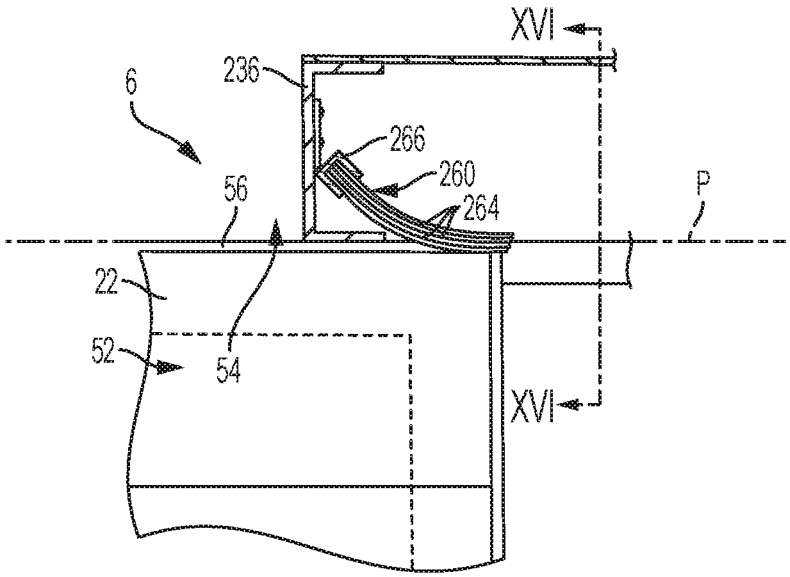
FIG. 14 is another top plan view of the side seal shown in FIG. 13, in which the side seal is deflected by a pallet assembly engaged therewith.

In addition, the fibers 264 of seal 260 are arranged to collectively present a substantially planar seal surface to the incoming corners of pallet assembly 52, with the seal surface facing into the pallet bay 202 as illustrated in FIG. 12. This substantially planar seal surface defines obtuse angle $\alpha$ with plane P, as shown in FIG. 13. In an exemplary embodiment, angle $\alpha$ is between 120 and 150 degrees. When pallet assembly 52 is received into and seated within bay 202, as shown by a comparison of FIGS. 13 and 14, this angular arrangement of the seal surface ensures that seal 260 deforms both in a depth direction, i.e., individual fibers 264 are urged deeper into bay 202 toward airflow opening 54 and chamber 6, as well as in a width direction, i.e., fibers 264 are urged sideways laterally away from pallet bay 202 and opening 54, as shown in FIG. 14. As noted above, left side seal 260 is a mirror image of right side seal 262 in the illustrated embodiment. Accordingly, the resiliently deformable seal surface formed by right side seal 262 also defines obtuse angle $\alpha$ which, in an exemplary embodiment, is identical to angle $\alpha$ defined by left side seal 260.

Although side seals 260, 262 are illustrated as resiliently deformable "brush seals" having seal fibers 264 as described above, it is contemplated that other resiliently deformable materials may be used to create the angled seal surfaces for similar engagement with the left and right corners of pallet assembly 52. For example, it is contemplated that a suitable seal surface can be formed from a sheet of flexible fabric, plastic or latex material stretched within a frame having the desired periphery and orientation. In another alternative, a resiliently deformable block of foam may be used, with the foam forming a sealing surface of similar size, shape, and orientation as the sealing surfaces of seals 260, 262. Moreover, any material may be chosen to form the sealing surfaces of seals 260, 262, provided that the materials present a "tangent" surface to the respective corners of pallet assembly 52 which can deflect to fill or substantially fill respective gaps formed by unevenly stacked cases 22, as shown in FIG. 16. This "tangent" surface is generally contacted directly by the corners of pallet assembly 52, such that the surfaces of individual cases 22 which form each respective portion of the corners form an acute angle with the adjacent sealing surface 260 or 262. For a typical case 22 having a corner which forms a right angle as shown in FIG. 13, for example, the adjacent surfaces of the case 22 form angles equal to ($\alpha$-90) degrees and (180-$\alpha$) degrees respectively, both of which are acute angles where $\alpha$ is obtuse as noted above.

Figure 6:
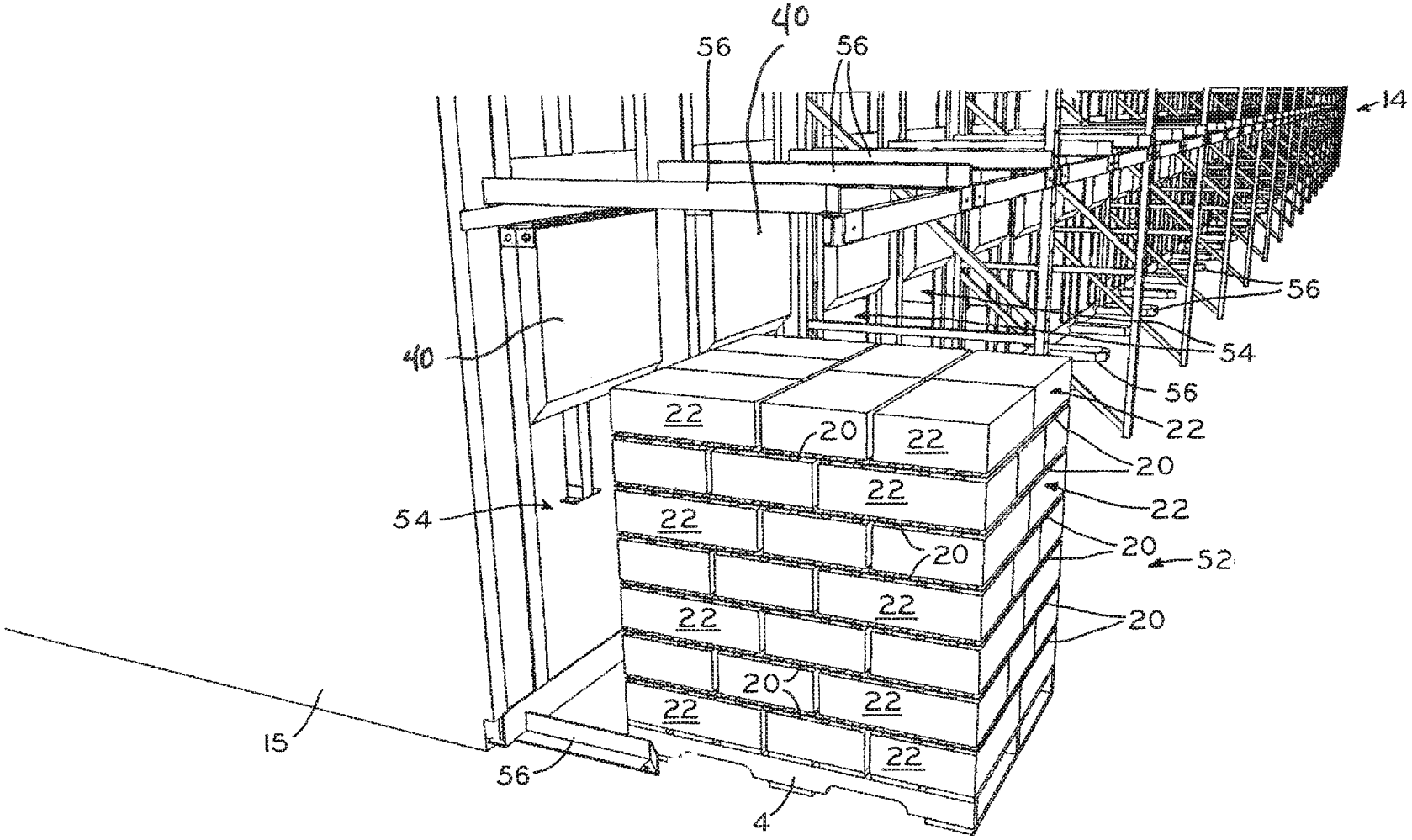
FIG. 6 is a perspective view illustrating loading of pallet assemblies into the racking illustrated, e.g., in FIGS. 3 and 4.
Figure 7:
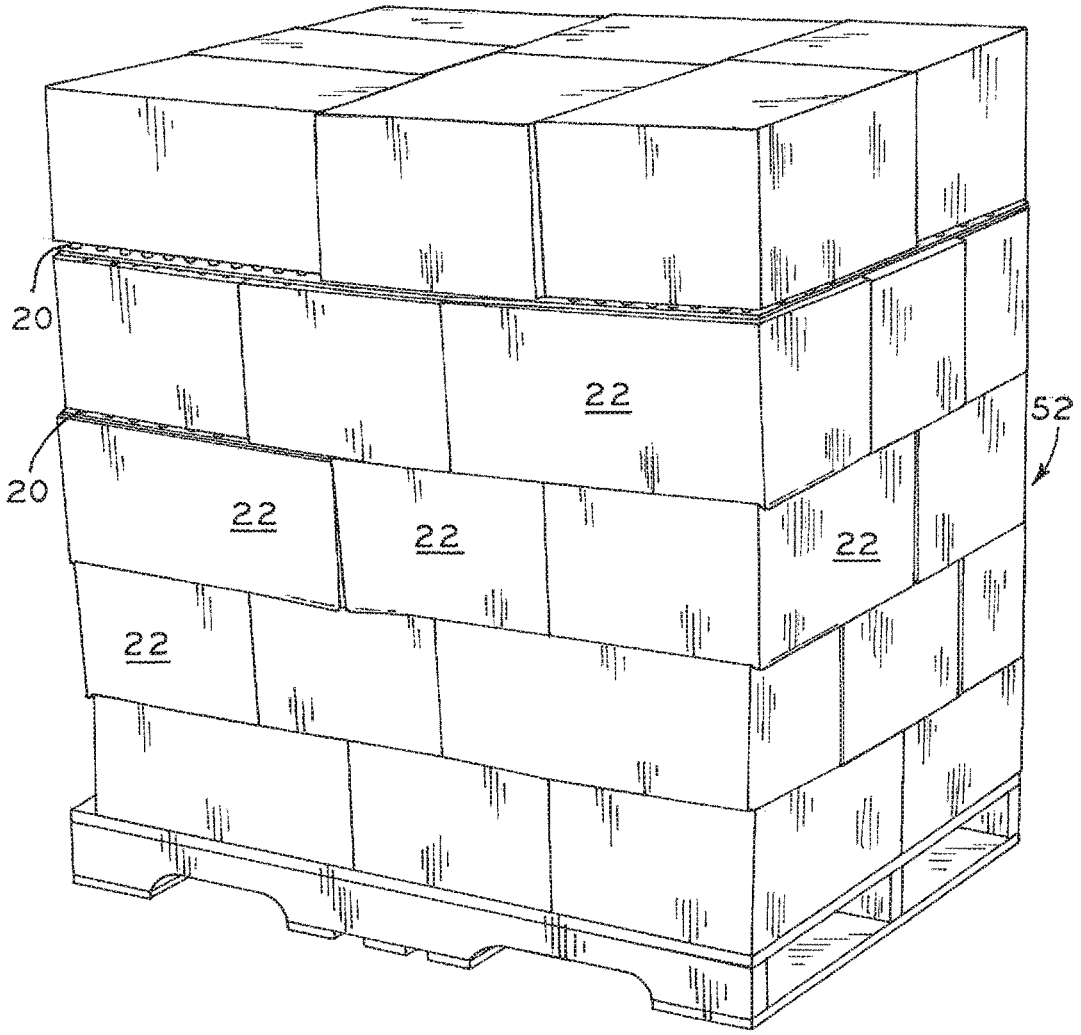
FIG. 7 is a perspective view of a pallet assembly incorporating a predicate spacer.
Figure 8:
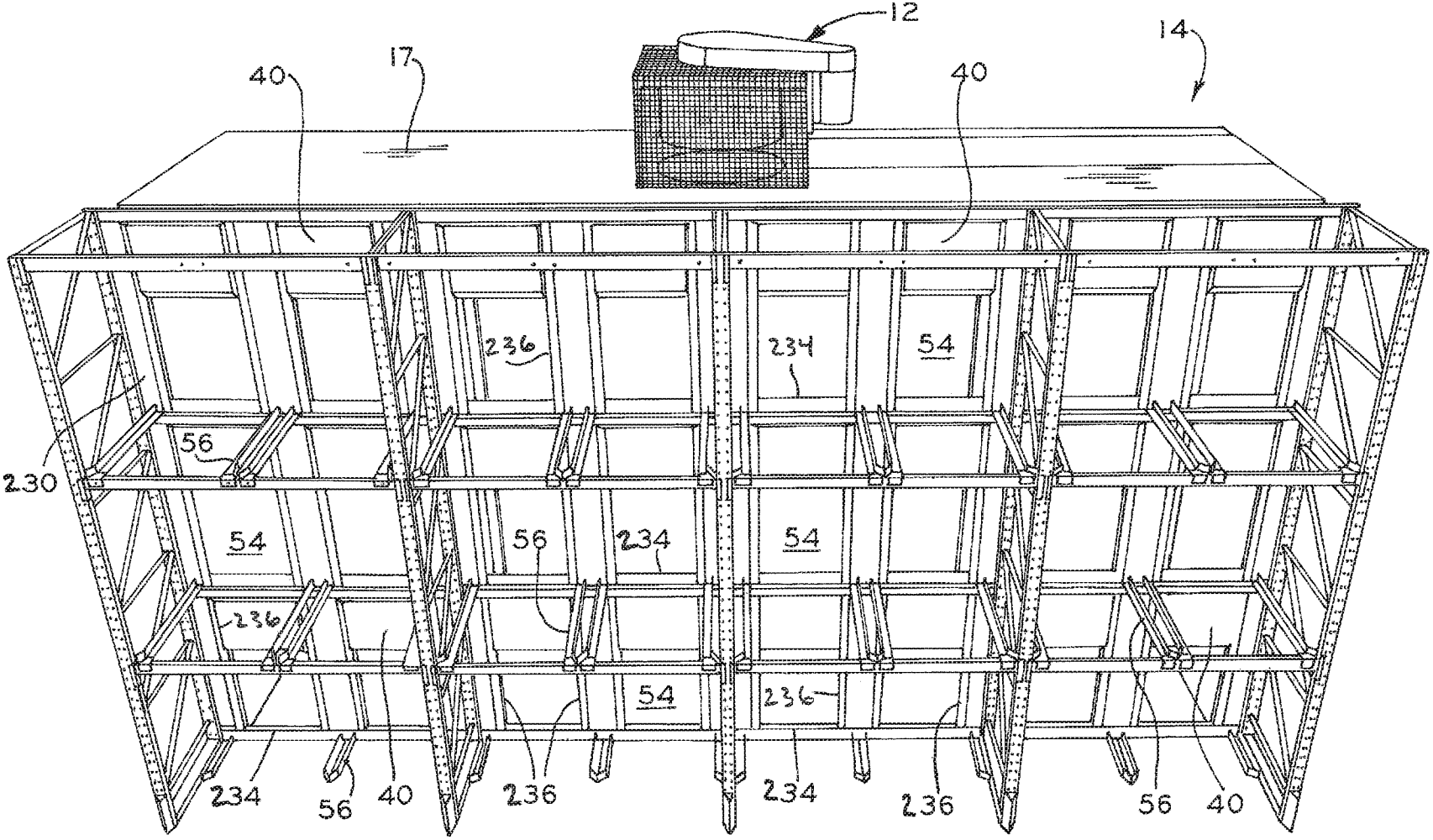
FIG. 8 is a perspective view of a portion of a racking structure accommodating 24 pallet assemblies on each side thereof.
Figure 17A:
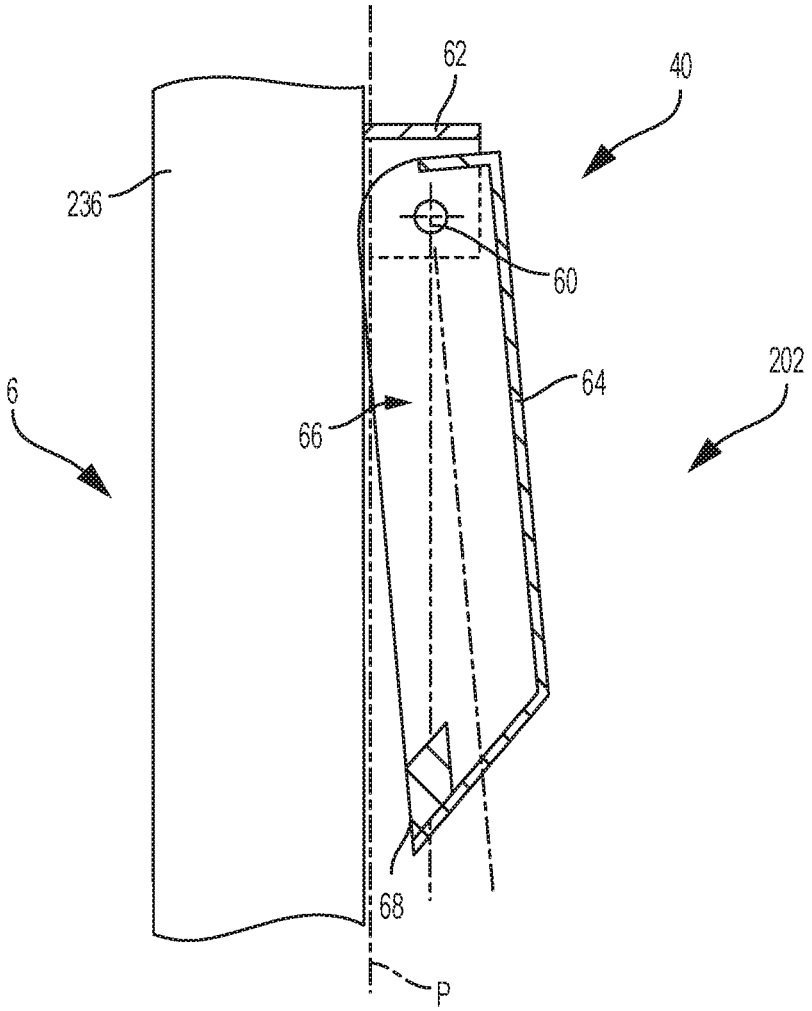
FIG. 17A is a cross-section, elevation view of a top swing seal in accordance with the present disclosure, taken along the line XVII-XVII of FIG. 12, and illustrating an at-rest position of the swing seal.
Figure 17B:
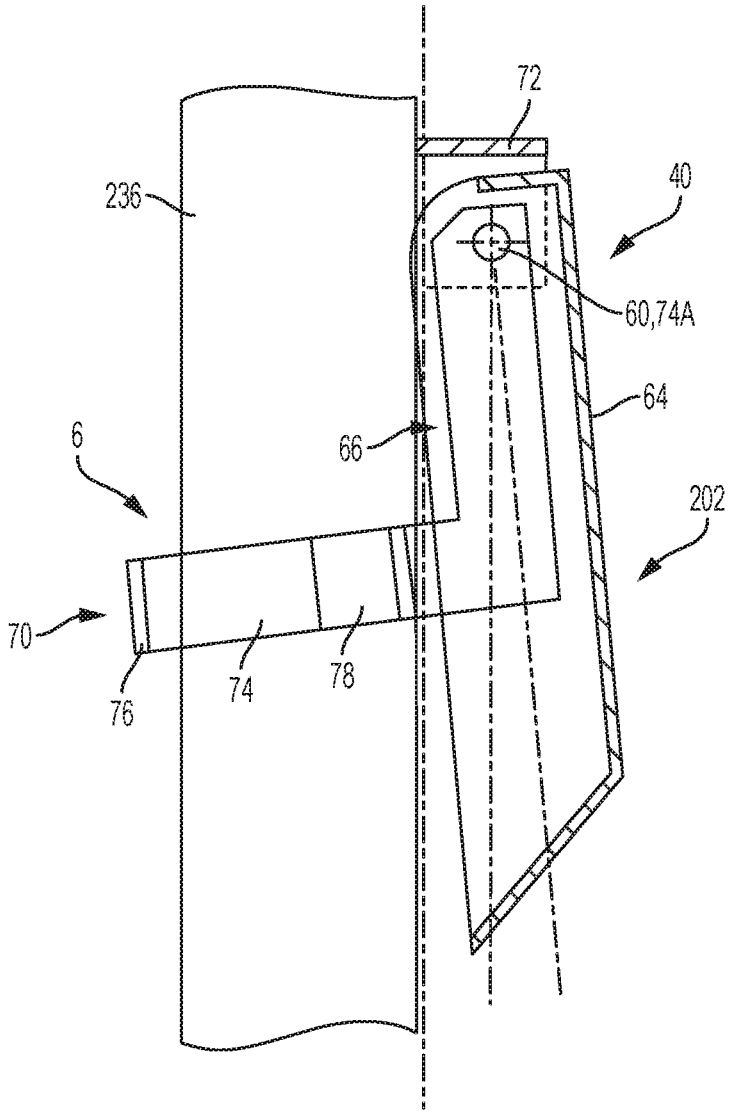
FIG. 17B is another cross-section, elevation view of a top swing seal in accordance with the present disclosure, taken along the line XVII-XVII of FIG. 12, and illustrating an at-rest position of the swing seal.
Figure 17C:
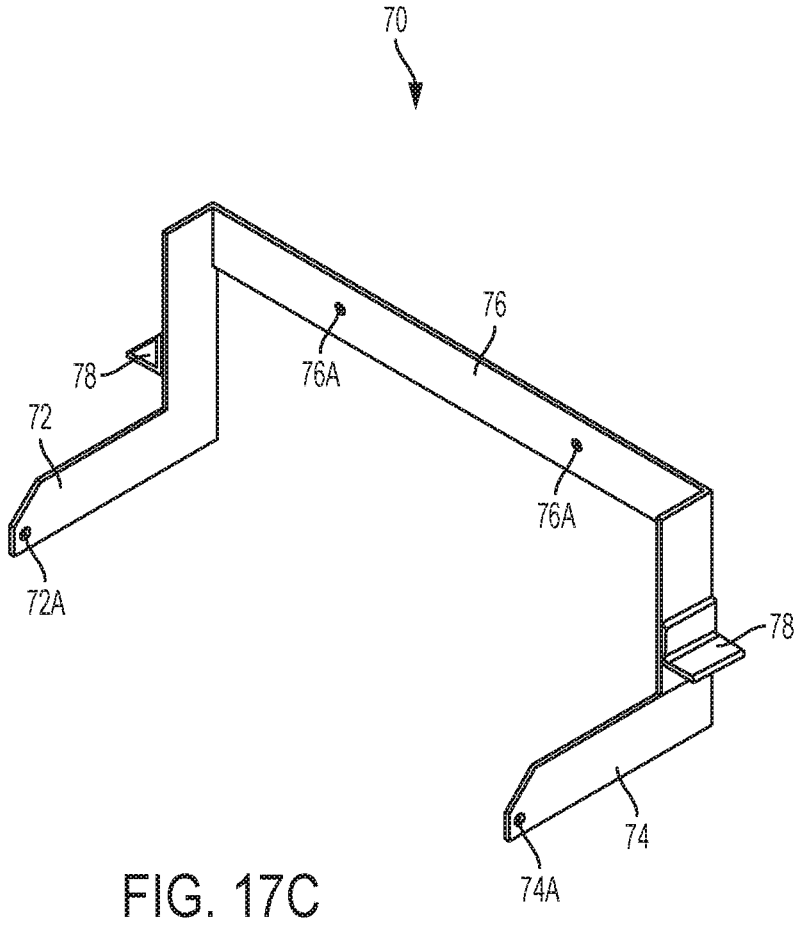
FIG. 17C is a perspective view of a swing seal weight assembly in accordance with the present disclosure.
Figure 18:
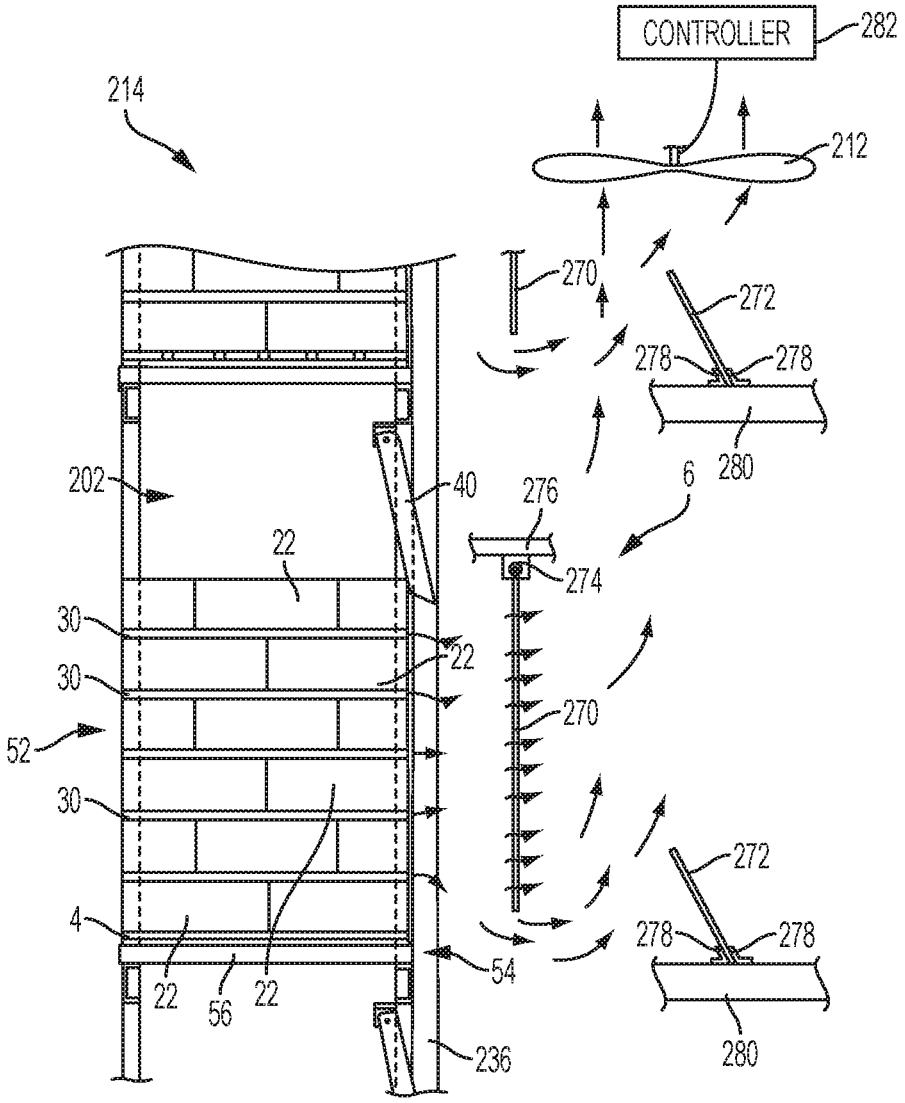
FIG. 18 is a schematic, elevation view of a portion of the racking assembly shown in FIG. 10, in which the pallet bay is occupied and an air dam disposed within the air plenum in a non-engaged configuration.

As noted above, swing seals 40 are used at the top portion of airflow opening 54 in order to seal the top inner corner of pallet assembly 52 against the forward facing surface of swing seal 40 to prevent air leakage over the top of pallet assembly 52 and through the top portion of airflow opening 54 when pallet assembly 52 is shorter than opening 54, as shown in FIG. 18. Additional details of an exemplary swing seal 40 are disclosed in U.S. Pat. No. 8,919,142, filed Mar. 29, 2011 and entitled "Swing Seal for a Rack Aisle Freezing and Chilling System", the entire disclosure of which is hereby explicitly incorporated by referenced herein. When pallet assembly 52 is fully seated in pallet bay 202 and pallet 4 is abutted against pallet stop frame member 238 as described above, a seal is formed between the upper edge of pallet assembly 52 and the adjacent seal surface 64 of swing seal 40 (FIG. 17). Swing seal 40 "automatically" adjusts to the height of pallet assembly 52, by pivoting as far as needed into chamber 6 to maintain a tight and even seal across the top inner edge of pallet assembly 52, as illustrated in FIGS. 6 and 18.

Turning now to FIG. 17, an exemplary embodiment of swing seal 40 is illustrated in cross-section, showing pivot point 60 which forms the horizontal pivot axis of swing seal 40. Swing seal 40 is pivotably connected to bracket 62 at pivot point 60, and bracket 62 is connected to vertical member 236 within bay 202. Thus, seal surface 64 of swing seal 40 sits proud of opening plane P and within bay 202 as illustrated. This configuration ensures that when pallet assembly 52 is fully seated within pallet bay 202, seal surface 64 will reliably engage the uppermost row of cases 22 to form the desired seal, even if cases 22 are slightly misaligned, e.g., if the top row of cases 22 have shifted along the depth direction toward the opening of bay 202 and aisle 10.

In order to further ensure a substantially air tight sealing engagement between seal surface 64 and pallet assembly 52, weight 68 may be disposed on the dished surface 66 opposite seal surface 64, and positioned nominally rearwardly (i.e., toward chamber 6) of pivot point 60 such that weight 68 creates a moment urging swing seal 40 to pivot inwardly toward pallet bay 202 as illustrated in FIG. 17. Thus, in the illustrated at-rest position, seal surface 64 is pivoted further inwardly toward pallet bay 202 in its at-rest orientation, as compared to a substantially vertical at-rest orientation which would result from using swing seal 40 without weight 68. This inward pivot further ensures firm engagement of seal surface 64 with pallet assembly 52, as shown in FIG. 18. In an exemplary embodiment, swing seal 40 may be about 30 inches in height and about 40 inches wide to accommodate a 40 inch wide pallet as described above. In this size, weight 68 may be formed as a bar extending across the lower portion of dished surface 66, having a weight of between 1 pound and 5 pounds and positioned between 1 inch and 12 inches rearwardly of pivot point 60, where the "rearward" direction is taken to be a direction perpendicular to seal surface 64.

In an alternative embodiment shown in FIG. 17B, swing seal weight assembly 70 may be used in place of, or in addition to, weight 68 shown in FIG. 17A. As best seen in FIG. 17C, weight assembly 70 includes left and right L-shaped pivot arms 72, 74 including a generally vertical portion which extends downwardly from pivot point 60, and a generally horizontal portion which extends rearwardly away from swing seal 40 into plenum 6. Pivot arms 72, 74 are joined at the ends of the rearwardly-extending portions by crossbar 76, and stop limit brackets 78 are coupled to outer surfaces of each of pivot arms 72, 74. Pivot apertures 72A, 74A are formed near the respective ends of the vertical portions of pivot arms 72, 74, opposite crossbar 76, and serve as a mounting point to pivotably attach weight assembly 70 to racking 14 (e.g., to vertical members 236 of racking 14) as further described below. Crossbar 76 further includes apertures 76A for affixation of additional weight to assembly 70, as needed. In an exemplary embodiment, assembly 70 is created from metal bar stock (e.g., steel) welded together to form a unitary whole with significant mass.

Referring still to FIG. 17B, assembly 70 is pivotably attached to brackets 62 at pivot points 60, via fasteners or a pivot axle passing through pivot apertures 72A and 74B on the left and right sides respectively (FIG. 17B is a cross-section showing the right-side attachment point, it being understood that the left side attachment is the same). Swing seal assembly 70 may be fixed to swing seal 40 at pivot points 60, such that swing seal 40 and weight assembly 70 rotate together as a single unit. Alternatively, weight assembly 70 may rotate independently of swing seal 40, and may urge swing seal 40 into bay 202 (as described below) by contact between brackets 78 and the edges of dished surface 66, and/or by contact between pivot bars 72, 74 and the inner portion of dished surface 66.

In use, the rearwardly-extending portions of pivot arms 72, 74 and crossbar 76 create a torque or moment about pivot point 60, such that weight assembly 70 contacts the substantially vertical swing seal 40 and urges swing seal 40 into pallet bay 40. Similar to weight 68 described above, this biases swing seal 40 into contact with the upper portion of the cases on any pallet assembly 52 received within bay 202, thereby ensuring a firm and effective seal therebetween. When bay 202 is vacant, however, limit stop brackets 78 are positioned to contact a portion of racking 14, such as a lip or surface of vertical frame members 236 (FIG. 17B), in order to prevent swing seal 40 from moving too far into the vacant bay 202 and creating an unnecessary vacant-bay airflow gap. Additional structures for preventing airflow through vacant bay 202 in the area below swing seal 40 are further discussed herein.

The amount of biasing force provided by seal assembly 70 may be varied as required or desired for a particular application. As noted above, weights (not shown) may be fixed to apertures 76A to increase the effective weight of crossbar 76, thereby increasing the moment applied about pivot point 60 and increasing the inward bias of swing seal 40 into bay 202. In addition, the material and geometry of weight assembly 70 may be modified as needed, with heavier materials and increasing rearward protrusion of pivot arms 72, 74 and crossbar 76 into plenum 6 both contributing to increased biasing force. For top-row use in racking 14, such rearward protrusion may be limited to avoid spatial conflict with fans 12, which may protrude downwardly into plenum 6. Accordingly, weight increases may be favored over geometry reconfigurations for increasing bias on swing seal 40 for top-row applications.

In a further alternative embodiment, swing seal 40 could be omitted entirely and a resiliently deformable seal of similar structure and arrangement to left and right side seals 260, 262 could be used along the top portion of the periphery of air flow opening 54. Such an arrangement would be appropriate, for example, where pallet assemblies 52 are expected to have a fixed height which about equal to the height of airflow opening 54.

As noted above, the provision of resiliently deformable side seals 260, 262 and a suitable top seal arrangement, such as swing seal 40 or a third deformable seal, creates a substantially air tight interface between pallet assembly 52 and airflow opening 54 even when pallet assembly 52 does not have even, linear corners and sealing surfaces. This airtight arrangement, in cooperation with the structure and design of air chamber 6 which is also air tight at end walls 15 and top panel 17, facilitates airflow driven by fans 212 almost entirely through the perforations in pallet assembly 52 (e.g., through air channels 38 formed in spacers 30, as shown in FIG. 9 and described above). Stated another way, the arrangement described above and shown in the drawings only requires sufficient total airflow through chamber 6 to achieve the desired function of thermal transfer between air within warehouse 2 and the product contained in cases 22, with very little additional airflow required to compensate for leakage or other inefficiencies. In one example, 1,500 to 3,000 cubic feet per minute (CFM) of air may pass through a typical pallet assembly 52 including spacers 30. Thus, for a set of ten pallet assemblies 52 served by a single fan 212, as little as 15,000 cubic feet per minute of fan capacity may be sufficient.

In an exemplary embodiment, fans 212 (FIG. 11) may be direct-drive, axial propeller fans configured to produce two horsepower running a 42-54 inch propeller at about 900 rpm. For purposes of the present disclosure a "direct drive" fan is a fan having a motor and a rotary motor output with a longitudinal axis, in which the motor output is coaxial with the rotary axis of the fan propeller, such as by having the motor output coupled directly to the propeller. This type of fan is highly efficient as compared to non-direct-drive fans, such as fan 12 shown in FIG. 8. Although fan 12 may of course be used in conjunction with racking assembly 214 as required or desired for a particular application, one or two direct drive fans 212 (such as two shown in FIG. 11) may be used for each set of 8 pallet bays 202 (i.e., four rows of two). Propeller fans 212 also have a reduced height above top panel 17 as compared to fan 12, which lowers the overall height of a given racking arrangement and, in some applications, may enable an additional row of pallet bays 202 within a given warehouse 2.

In the illustrated embodiment of FIG. 11, additional end walls 15 may be used in the interior of chamber 6, in addition to end walls 15 at the terminal lateral ends of chamber 6. These interior walls 15 partition chamber 6 into hermetically sealed units within racking assembly 214, creating airflow isolation between portions of air chamber 6. In this configuration, fans 212 may be selectively powered or left idle depending on which parts of racking assembly 214 are in use at any one time. In an exemplary embodiment, top panel 17 may include modular fan mounting tracks periodically arranged to coincide with each partitioned portion of chamber 6, with each set of mounting tracks sized to accept one or two fans 212. As noted above, a single fan 212 having a 20,000 CFM capacity may be sufficient to serve up to 8-10 bays 202 (i.e., 4-5 rows of two bays 202), while a second fan 212 of the same capacity raises the upper limit to 16-20 bays 202 (i.e., 8-10 rows of two bays 202). In shorter racking arrangements where only a single fan 212 is needed, a plug panel may be mounted to the mounting tracks to enclose the partitioned portion of chamber 6. In other embodiments, interior walls 15 may be placed in other locations to create rows of 1, 2, 3 or 4 pallet bays 202 in each partitioned portion of chamber 6, with the number of fans 212 also ranging between 1 and 4 fans per partitioned portion as required or desired for a particular application. Moreover, the modular system described herein can be configured in any desired arrangement of partitions, fan capacity, and overall rack width and height as needed.

The use of relatively lower-power direct-drive axial fans 212 is enabled by the airtight arrangement of racking 214, such that two or even one 2 horsepower direct drive fan 212 may be used for a set of 8 pallet bays 202 as noted above. This represents a 20-60% efficiency improvement over conventional centrifugal fans 12. Stated another way, a reduced pressure differential within chamber 6 may be used in racking 214 while still performing sufficient heat transfer operations on pallet assemblies 52, as compared to predicate designs. In an exemplary embodiment, a pressure differential of 0.25 inches of water may be sufficient to draw a desired amount of air through pallet assemblies 52 using racking 214, as compared to up to in excess of 1 inch of water for high power centrifugal fan arrangement. In one particular exemplary embodiment, 0.375 inches of water has been found to be more than adequate for blast freezing operations where fans 212 create a vacuum pressure differential in chamber 6 as compared to the ambient pressure within warehouse 2, such that air is drawn through pallet assemblies 52 from the ambient vicinity (e.g., aisles 10 of FIG. 1) and into chamber 6 via airflow openings 54.

As an alternative to fans 212 creating vacuum pressure within chamber 6 as described above, it is contemplated that fans 212 may be reversed to create a relatively higher pressure in chamber 6 compared to the ambient environment, such that airflow is reversed through pallet assemblies 52. In this configuration, air is "pushed" through spacers 30 from airflow opening 54 toward the ambient environment of warehouse 2, rather than being "drawn" through pallet assemblies 52 when fans 212 create a vacuum pressure within chamber 6. In the case where fans 212 blow into chamber 6 to elevate the pressure therein, fans 212 form the inlet of the illustrated embodiment, and airflow openings 54 form the outlet. Conversely, where fans 212 blow outwardly to exhaust air from chamber 6, fans 212 are the outlet and airflow openings 54 are the inlets.

3. Vacant-Bay Compensation.

In addition to the above-described seal arrangement around the periphery of airflow opening 54 and the modular partitioning of chamber 6, efficient heat-transfer operation of racking 214 may be accomplished by avoiding performance reductions when pallet assemblies 52 are removed from bays 202 to create one or more vacant bays 202 as illustrated in FIG. 10. In particular, racking 214 may avoid large flows of air through airflow openings 54 when bays 202 are vacant by a baffle system, as described in detail below, thereby avoiding the need to increase fan capacity to maintain desired air flows through pallet assemblies 52 in the remaining occupied bays 202.

Figure 19:
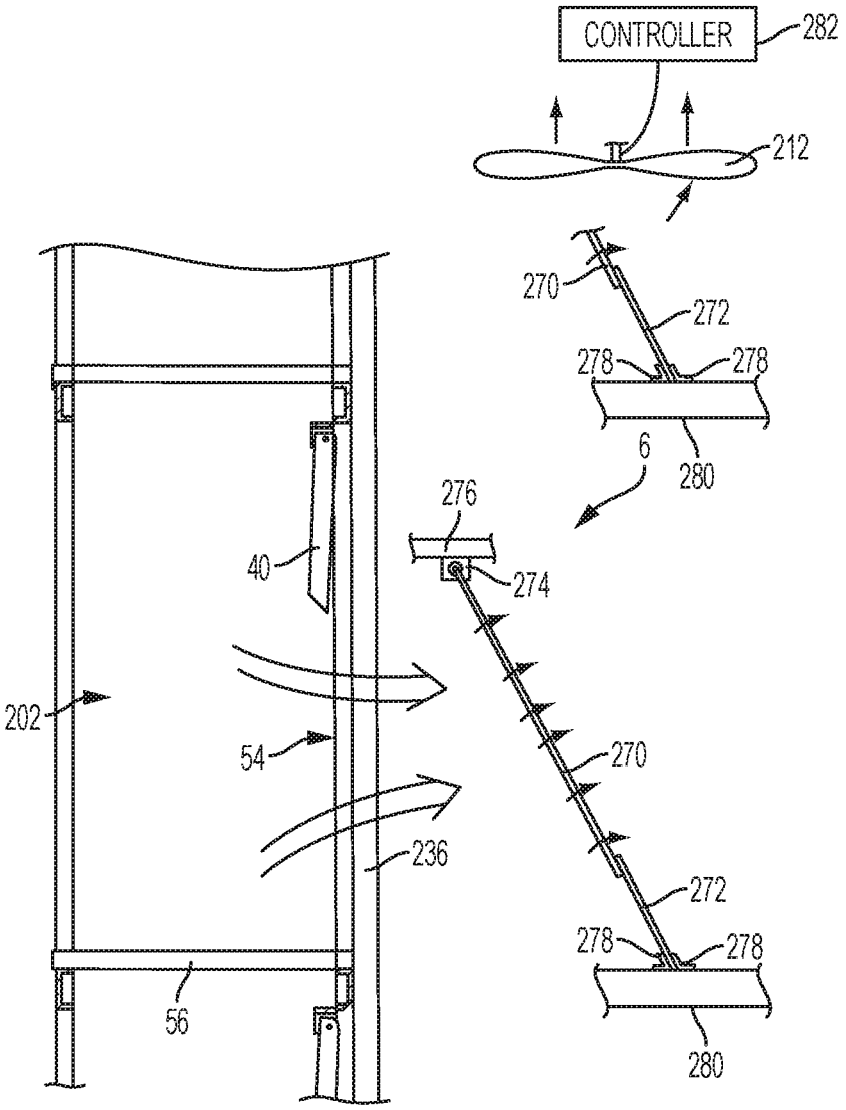
FIG. 19 is another schematic, elevation view of the portion of the racking assembly shown in FIG. 18, in which the pallet bay is vacant and the air dam has moved to its engaged configuration[.]

Turning now to FIGS. 18 and 19, a set of air dams 270 are illustrated in disengaged configurations (FIG. 18) and engaged configurations (FIG. 19). Air dams 270 are provided to facilitate less than 100% occupancy (FIG. 10) in pallet bays 202 served by a fan or fans 212. In particular, and as described in further detail below, air dams 270 arrest the increased airflow through airflow opening 54 when a pallet bay 202 is vacant (FIG. 19) as compared to such a pallet bay 202 being occupied by pallet assembly 52 (FIG. 18).

Referring specifically to FIG. 18, air dam 270 is pivotably mounted to air dam frame member 276 within chamber 6 via pivot connection 274. At a location downstream of air dam 270, dam stop 272 is fixed to dam stop frame member 280 via a fixed connection, e.g. brackets 278. When the pallet bay 202 adjacent air dam 270 includes a pallet assembly 52 sealingly engaged with opening 54, as illustrated, an operational airflow passes through spacers 30 and into chamber 6 via airflow opening 54. This operational airflow passes under and around air dam 270, and in some exemplary embodiments, air dam 270 itself may be perforated to allow a set amount of airflow directly through air dam 270 as illustrated. Accordingly, air dam 270 is configured to allow the operational airflow to proceed unencumbered and therefore creates no significant impairment of the function of racking assembly 214.

Turning to FIG. 19, pallet bay 202 is shown vacant, with pallet assembly 52 having been removed. In this configuration, the amount of airflow through the now-unobstructed airflow opening 54 experiences a brief but significant increase. For example, in one embodiment, airflow may increase between 50% to 100% from 2,000 to 3,000 cubic feet per minute through pallet assembly 52 with spacers 30, up to about 4,000 cubic feet per minute when pallet assembly 52 is removed. For pallet assemblies 52 with predicate spacers 20, this increase may be even more drastic. This increased airflow also increases the air pressure on air dam 270, causing it to pivot about pivot connection 274 and come into contact with dam stop 272. At this point, airflow under air dam 270 is arrested. For solid air dams 270, no significant flow is permitted in this configuration, while only a minimal amount of airflow through perforated air dams 270 is permitted. Air dam 270 remains in its closed position until pallet assembly 52 is loaded back into pallet bay 202, reducing the local air pressure differential and allowing air dam 270 to pivot back to the disengaged configuration of FIG. 18 under its own weight. Air dam 270 reduces the airflow through the vacant bay 202, obviating any need to increase the power or speed of fan 212 to compensate for the extra airflow while maintaining a desired pressure differential within chamber 6.

In another embodiment, air dam 270 may be manually or automatically controllable, such as by pneumatic cylinders with two way actuation. Such cylinders may pivot air dam 270 into the engaged configuration (FIG. 19) or the disengaged configuration (FIG. 18) based on the instruction of an operator or electronic controller 282.

In addition, it is contemplated that controller 282 may be provided and operably connected to fan 212 in order to control the pressure differential in airflow through chamber 6 depending on changing conditions, e.g., the number of vacant pallet bays 202 within a given configuration of racking 214. For example, controller 282 may monitor pressure within chamber 6 with a transducer, and compare the measured pressure with a desired set point or a range of set points. When the measured pressure falls by a threshold amount, such as outside the acceptable pre-determined range of pressures, fan 212 may be sped up or a second fan 212 may be activated in order to bring the pressure differential back to a desired set point. Thus, when pallet assemblies 52 are removed from bays 202 increasing airflow to chamber 6, fans 212 may increase speed to compensate as long as necessary. For example, fan 212 may speed up to induce actuation of air dam 270 as shown in FIG. 19, and then slow back down to a speed sufficient only to retain air dam 270 in the desired closed configuration. In some configurations, air dam 270 may be omitted and controller 282 may provide all of the necessary increase in air flow to compensate for vacant bays.

In the illustrated embodiment of FIGS. 18 and 19, air dams 270 are configured to pivot in a downstream air flow direction from bays 202 toward chamber 6. Thus, the illustrated embodiment uses a vacuum pressure developed within chamber 6 by fans 212 exhausting to the ambient air as described above. In an embodiment where higher pressure is developed in chamber 6 by fans 212 blowing into chamber 6, air dams 270 will be arranged to pivot in the opposite direction as illustrated in FIGS. 18 and 19.

Air dams 270 may be provided in a variety of forms and configurations, as required or desired for a particular application. In one example, air dams 270 may be formed from a series of powered louvers or dampers *271, shown in FIG. 20,* located inside the plenum space or chamber 6. Such louvers/dampers *271* may be individually pivotable and collectively linked to a single actuator, such that the plurality of louvers *271* can be collectively actuated to block or restrict airflow when a respective bay 202 is unoccupied. Such louvers *271* may be provided in sufficient number and size to block or restrict the air flow path for a single bay 202, or can be provided in a larger number and/or size to block or restrict airflow through a number of bays 202 for certain applications.

In another embodiment, air dams 270 may be provided as an integrated "constant air volume" damper located inside the plenum space or chamber 6, and includes one or more air flow-driven dampers which are arranged and balanced to maintain a constant-volume air flow through opening 54 regardless of whether bay 202 is occupied, unoccupied or partially occupied. Additional details of a commercially available constant air volume damper device is contained in Appendix A, entitled "CVQ Constant Air Volume Damper", forming a part of the present application, the entire disclosure of which is incorporated by reference herein. In an exemplary embodiment, such a constant air volume damper controls the airflow volume for a single bay 202.

As an alternative to the constant air volume damper described above, a similar system may be provided with a damper designed to deliver a variable air volume. In this embodiment, the damper is located inside the plenum space adjacent bay 202, similar to the embodiment described above. However, when bay 202 is unoccupied airflow volume through opening 54 is significantly reduced as compared to the corresponding airflow volume when bay 202 is occupied by pallet assembly 52. In an exemplary embodiment, such a variable volume damper controls the airflow volume for a single bay 202.

In yet another embodiment, a tilting panel of similar construction to air dam 270 (FIGS. 18 and 19) is provided with a "normally closed" configuration, i.e., air dam 270 is biased into an airflow-blocking configuration (similar to FIG. 19) by a biasing element such as gas struts, springs or a spring-biased hinge. Air dam 270 is pushed to an open configuration (similar to the configuration shown in FIG. 18) when a pallet assembly 52 is installed into the adjacent bay 202. In particular, when pallet assembly 52 is loaded into bay 202, pallet assembly 52 engages a portion of the air dam 270 and physically pushes air dam 270 against the closing force of the biasing element. This tilts the panel into an open configuration in which air is allowed to flow freely through opening 54.

In yet another embodiment, a door (similar to air dam 270) may be pivoted about a vertical axis with a hinge positioned at either the left or right of opening 54. When the adjacent bay 202 is unoccupied, the door is swung closed either manually or automatically, e.g., with a door actuator controllable by a switch and/or electronic controller. The door may be positioned inside chamber 6, swinging outwardly away from opening 54 into chamber 6, or may be positioned outside chamber 6 and within bay 202, swinging inwardly into bay 202. If the door swings inwardly, actuation must occur when bay 202 is unoccupied.

In still another embodiment, a roll-up style door may be provided within chamber 6 (i.e., on the chamber side of opening 54) or external to chamber 6 (i.e., on the bay side of opening 54). The roll-up style door is rolled down to cover opening 54 when bay 202 is unoccupied, and rolled up to allow airflow through opening 54 when bay 202 is occupied.

For any of the above-described structures for selectively blocking or allowing airflow through opening 54, an auxiliary opening may be provided within chamber 6 and spaced away from opening 54. This auxiliary opening may take the form of a sheet metal box attached to the chamber side of wall 230, such that the sheet metal fluidly isolates the interior of the box from chamber 6 except through the auxiliary opening. The auxiliary opening is positioned to generally align with opening 54, such that air may flow through both opening 54 and the auxiliary opening as it moves between bay 202 and chamber 6. The auxiliary opening may be selectively blocked in order to selectively interrupt such airflow as described above, rather than directly blocking opening 54. The interior space of the box shifts the selectively blocked airflow opening away from bay 202 and into chamber 6, thereby providing a physical space and volume to accommodate various air blocking structure designs.

While this disclosure has been described as having exemplary designs, the present invention can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An installation for warehousing palletized product, comprising:

a pallet assembly comprising:

a pallet; and a plurality of vertically stacked rows of cases disposed on the pallet and providing an airflow pathway through the vertically stacked rows of cases containing the product; and a pallet racking assembly comprising:

a pallet receiving space sized and configured to receive the pallet assembly;

an airflow chamber including an air inlet and an air outlet;

an air handler configured and positioned to direct air into the airflow chamber from the air inlet and exhaust air from the airflow chamber through the air outlet;

a wall disposed between the pallet receiving space and the airflow chamber, the wall having an airflow opening sized and positioned to be engaged by the pallet assembly when the pallet assembly is received within the pallet receiving space, the airflow opening defining an unobstructed airflow when the pallet assembly is absent from the pallet receiving space and an operational airflow when the airflow opening is engaged by the pallet assembly, the operational airflow less than the unobstructed airflow; and an air dam positioned adjacent the airflow opening and configured to [at least partially] *selectively* obstruct the airflow opening, *the air dam having a plurality of individually pivotable dampers actuatable between a closed configuration obstructing airflow through the airflow opening and an open configuration permitting airflow through the airflow opening,*

*whereby* the air dam and the airflow opening [cooperating] *cooperate* to define a vacant-bay airflow when the pallet assembly is absent from the pallet receiving space *and the air dam is in the closed configuration*, the vacant-bay airflow less than the unobstructed airflow.

2. The installation of claim 1, wherein the air dam comprises a plurality of openings therethrough, the plurality of openings sized to provide the partial obstruction of the airflow opening while allowing the operational airflow to pass therethrough.

3. The installation of claim 1, wherein [the air dam is movable between a disengaged configuration and an engaged configuration, the engaged configuration creating the partial obstruction of the airflow opening to define the vacant-bay airflow, and]

the [disengaged] *open* configuration [defining] *defines* reduced obstruction of the airflow opening as compared to the [partial obstruction] *closed configuration*, such that the [disengaged] *open* configuration of the air dam cooperates with the airflow opening to define an occupied-bay airflow commensurate with the operational airflow, whereby the air dam does not impede airflow through the pallet assembly when in the [disengaged] *open* configuration.

4. The installation of claim 3, further comprising an air dam frame member disposed within the airflow chamber, *a plurality of individually pivotable dampers of* the air dam pivotably mounted to the air dam frame and pivotable between the [engaged] *closed* configuration and the [disengaged] *open* configuration.

[5. The installation of claim 4, further comprising a dam stop fixed within the airflow chamber, the dam stop positioned to be engaged by the air dam when the air dam is in its disengaged configuration.]

6. The installation of claim 4, wherein [the air dam is a solid air dam lacking apertures therethrough, whereby] the vacant-bay airflow is about zero.

[7. The installation of claim 4, wherein the air dam is a perforated air dam having apertures therethrough, whereby the vacant-bay airflow is above zero.]

[8. The installation of claim 3, wherein the air dam is actuated by air flow, such that an increase in airflow through the airflow opening urges the air dam toward the engaged configuration.]

9. The installation of claim 1, wherein:

the pallet racking assembly comprises a plurality of the pallet receiving spaces arranged in vertically spaced horizontal rows;

the wall includes a plurality of the airflow openings respectively disposed at each of the plurality of the pallet receiving spaces, whereby the pallet racking assembly is configured to accommodate a plurality of pallet assemblies, each of the airflow openings defining the unobstructed airflow when a respective pallet assembly is absent from the respective pallet receiving space and the operational airflow when the respective airflow opening is engaged by the respective pallet assembly; and each of the plurality of the airflow openings includes the air dam positioned adjacent thereto and cooperating with the respective airflow opening to define the vacant-bay airflow.

10. The installation of claim 9, wherein the air handler defines an airflow output capacity less than the aggregated unobstructed airflow of the plurality of airflow openings but at least as much as the aggregated operational airflow and vacant-bay airflow of the plurality of airflow openings, whereby the air handler for the pallet racking assembly has a reduced capacity as compared to a racking system lacking the air dams.

11. The installation of claim 1, wherein the unobstructed airflow is between 50% to 100% greater than the operational airflow.

12. The installation of claim 1, wherein the pallet assembly includes at least one spacer disposed between the plurality of vertically stacked rows of cases, the spacer having a longitudinal airflow channel formed therethrough, the spacer cooperating with the plurality of vertically stacked rows of cases and the airflow opening to define the operational airflow.

13. The installation of claim 12, wherein the operational airflow is between 2,000 to 3,000 cubic feet per minute.

14. The installation of claim 13, wherein the unobstructed airflow is about 4,000 cubic feet per minute.

15. The installation of claim 1, further comprising:

a controller operably connected to the air handler, a pressure transducer configured to measure a pressure within the air chamber, the pressure transducer operably connected to the controller;

the controller programmed to compare the measured pressure with a threshold and operate the air handler to maintain the measured pressure within an acceptable pre-determined range of pressures.

16. The installation of claim 15, wherein

[the air dam is movable between a disengaged configuration and an engaged configuration, the engaged configuration creating the partial obstruction of the airflow opening to define the vacant-bay airflow, and] the [disengaged] *open* configuration [defining] *defines* reduced obstruction of the airflow opening as compared to the [partial obstruction] *closed configuration*, such that the [disengaged] *open* configuration of the air dam cooperates with the airflow opening to define an occupied-bay airflow commensurate with the operational airflow, whereby the air dam does not impede airflow through the pallet assembly when in the [disengaged] *open* configuration, the installation further comprising:

an actuator connected to the air dam, the controller operably connected to the actuator and programmed to move the air dam into the [engaged] *closed* configuration when the pallet assembly is absent from the pallet receiving space and the [disengaged] *open* configuration when the airflow opening is engaged by the pallet assembly.

17. A method of operating an installation for warehousing palletized product, the installation including a pallet racking assembly including a pallet receiving space sized and configured to receive a pallet assembly, an airflow chamber including an air inlet and an air outlet, an air handler configured and positioned to direct air into the airflow chamber from the air inlet and exhaust air from the airflow chamber through the air outlet, and a wall disposed between the pallet receiving space and the airflow chamber, the wall having an airflow opening, the method comprising:

activating the air handler to create a pressure differential between the airflow chamber and the pallet receiving space, the pressure differential creating a vacant-bay airflow passing an air dam adjacent the pallet receiving space, *the air dam having a plurality of individually pivotable dampers actuatable between a closed configuration corresponding to the vacant-bay airflow and an open configuration permitting airflow through the airflow opening corresponding to an unobstructed airflow such that* the vacant-bay airflow *is* less than [an] *the* unobstructed airflow [that would be defined by the airflow opening alone] given the pressure differential; and loading a pallet assembly into the pallet receiving space such that the pallet assembly occupies the pallet receiving space and blocks the airflow opening, the pressure differential creating an operational airflow through the pallet assembly, through the airflow opening and passing the air dam, the operational airflow less than the unobstructed airflow.

18. The method of claim 17, further comprising leaving a second pallet receiving space vacant such that the pressure differential creates an operational airflow through the occupied pallet receiving space and a vacant-bay airflow through the vacant pallet receiving space.

19. The method of claim 18, wherein the vacant-bay airflow through the vacant pallet receiving space is less than the operational airflow through the occupied pallet receiving space.

20. The method of claim 18, wherein the step of moving the air dam is effected by an actuator coupled to the air dam and controlled by a controller.

21. The method of claim 18, further comprising controlling a speed of the air handler to maintain the pressure differential within a predetermined range.

22. The method of claim 17, further comprising moving the air dam from a disengaged configuration to an engaged configuration during the step of loading the pallet assembly.

23. The method of claim 22, wherein the step of moving the air dam comprises pivoting *the pivotable dampers of* the air dam within the airflow chamber.

[24. The method of claim 22, wherein the step of moving the air dam is effected by the pressure differential.]

*25. The method of claim 17, further comprising, after the step of loading the pallet assembly into the pallet receiving space, independently actuating the plurality of individually pivotable dampers.*

*26. The method of claim 17, wherein the plurality of individually pivotable dampers includes air flow-driven dampers which are arranged and balanced to maintain a constant-volume air flow through the airflow opening regardless of whether the pallet receiving space is occupied, unoccupied or partially occupied.*

*27. The installation of claim 1, wherein the plurality of individually pivotable dampers are configured to independently actuate.*

*28. The installation of claim 1, wherein the plurality of individually pivotable dampers includes air flow-driven dampers which are arranged and balanced to maintain a constant-volume air flow through the airflow opening regardless of whether the pallet receiving space is occupied, unoccupied or partially occupied.*

*29. An installation for warehousing palletized product, comprising:*

*a pallet assembly comprising:*

*a pallet; and*

*a plurality of vertically stacked rows of cases disposed on the pallet and providing an airflow pathway through the vertically stacked rows of cases containing the product; and*

*a pallet racking assembly comprising:*

*a pallet receiving space sized and configured to receive the pallet assembly;*

*an airflow chamber including an air inlet and an air outlet;*

*an air handler configured and positioned to direct air into the airflow chamber from the air inlet and exhaust air from the airflow chamber through the air outlet;*

*a wall disposed between the pallet receiving space and the airflow chamber, the wall having an airflow opening sized and positioned to be engaged by the pallet assembly when the pallet assembly is received within the pallet receiving space, the airflow opening defining an unobstructed airflow when the pallet assembly is absent from the pallet receiving space and an operational airflow when the airflow opening is engaged by the pallet assembly, the operational airflow less than the unobstructed airflow; and*

*an air dam positioned adjacent the airflow opening and configured to at least partially obstruct the airflow opening, the air dam and the airflow opening cooperating to define a vacant-bay airflow when the pallet assembly is absent from the pallet receiving space, the vacant-bay airflow less than the unobstructed airflow, wherein the air dam comprises a plurality of openings therethrough, the plurality of openings sized to provide the partial obstruction of the airflow opening while allowing the operational airflow to pass therethrough.*

*30. The installation of claim 29, wherein the air dam has a plurality of individually pivotable dampers actuatable between a closed configuration obstructing airflow through the airflow opening and an open configuration permitting airflow through the airflow opening, the plurality of individually pivotable dampers defining the plurality of openings.*

* * * * *